United States Patent
Imamichi et al.

(10) Patent No.: US 12,531,116 B2
(45) Date of Patent: Jan. 20, 2026

(54) TLS-BASED OPTIMIZATION OF STARK TONE TUNING

(71) Applicant: International Business Machines Corporation, Armonk, NY (US)

(72) Inventors: Takashi Imamichi, Tokyo (JP); Naoki Kanazawa, Yokohama (JP); Sami Rosenblatt, White Plains, NY (US); Benjamin Fearon, Brooklyn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 942 days.

(21) Appl. No.: 17/554,994

(22) Filed: Dec. 17, 2021

(65) Prior Publication Data
US 2023/0197147 A1    Jun. 22, 2023

(51) Int. Cl.
  G11C 11/44        (2006.01)
  G06N 10/40        (2022.01)

(52) U.S. Cl.
  CPC ............ *G11C 11/44* (2013.01); *G06N 10/40* (2022.01)

(58) Field of Classification Search
  CPC ......... G11C 11/44; G06N 10/40; G06N 10/70
  See application file for complete search history.

(56) References Cited

U.S. PATENT DOCUMENTS

| | | | |
|---|---|---|---|
| 7,847,615 B2 | 12/2010 | Yorozu et al. | |
| 9,432,024 B2 | 8/2016 | Chow et al. | |
| 10,282,675 B2 | 5/2019 | Bloom et al. | |
| 10,366,340 B2 | 7/2019 | Przybysz | |
| 10,467,544 B2 | 11/2019 | Filipp et al. | |
| 10,622,536 B2 | 4/2020 | Chow et al. | |
| 10,755,193 B2 | 8/2020 | Kandala et al. | |
| 10,833,680 B2 | 11/2020 | Mckay et al. | |
| 10,892,398 B2 | 1/2021 | Pollanen et al. | |

(Continued)

FOREIGN PATENT DOCUMENTS

| CN | 112215360 A | 1/2021 |
|---|---|---|
| CN | 112444714 A | 3/2021 |

(Continued)

OTHER PUBLICATIONS

Chang et al "On Quantum Computing for Mixed-Integer Programming", retrieved from https://arxiv.org/pdf/2010.07852v1 and dated Oct. 15, 2020 (Year: 2020).*

(Continued)

*Primary Examiner* — Sanchita Roy
(74) *Attorney, Agent, or Firm* — Amin, Turocy & Watson, LLP

(57) ABSTRACT

Systems and techniques that facilitate TLS-based optimization of Stark tone tuning are provided. In various embodiments, a system can comprise a receiver component that can access a qubit topology. In various aspects, the system can further comprise an optimization component that can identify, based on a set of two-level-system, (TLS) frequency regions of the qubit topology, one or more Stark tone frequencies. In various instances, the system can further comprise an execution component that can apply, to a qubit lattice corresponding to the qubit topology, one or more Stark tones that have the one or more Stark tone frequencies, thereby eliminating frequency collisions in the qubit lattice.

23 Claims, 17 Drawing Sheets

(56) References Cited

U.S. PATENT DOCUMENTS

| | | | |
|---|---|---|---|
| 10,900,998 B1 | | 1/2021 | Sandberg et al. |
| 10,924,095 B1 | | 2/2021 | Mckay et al. |
| 11,004,009 B2 | | 5/2021 | Monroe et al. |
| 11,017,310 B2 | | 5/2021 | Chu et al. |
| 11,244,241 B1 | * | 2/2022 | Gambetta .............. G06N 10/00 |
| 11,681,016 B1 | | 6/2023 | Bohaichuk et al. |
| 2019/0165244 A1 | | 5/2019 | Hertzenberg et al. |
| 2020/0274703 A1 | | 8/2020 | Lukens et al. |
| 2021/0036206 A1 | | 2/2021 | Neill et al. |
| 2021/0049494 A1 | | 2/2021 | King et al. |
| 2021/0182096 A1 | | 6/2021 | Walker et al. |
| 2021/0208231 A1 | | 7/2021 | Lachance-Quirion et al. |
| 2021/0272001 A1 | | 9/2021 | Smelyanskiy et al. |
| 2021/0334689 A1 | | 10/2021 | Klimov et al. |
| 2022/0196716 A1 | | 6/2022 | Anderson et al. |
| 2023/0169252 A1 | | 6/2023 | Stehlik et al. |
| 2023/0176935 A1 | | 6/2023 | Earnest-Noble et al. |
| 2023/0289400 A1 | | 9/2023 | Carroll et al. |

FOREIGN PATENT DOCUMENTS

| | | | |
|---|---|---|---|
| WO | 2018063168 A1 | 4/2018 | |
| WO | 2020263255 A1 | 12/2020 | |
| WO | 2021/170164 A1 | 9/2021 | |

OTHER PUBLICATIONS

Li, G et al. | "Towards Efficient Superconducting Quantum Processor Architecture Design". ASPLOS'20, Mar. 16-20, 2020, Lausanne, Switzerland, 15 pages.

IBM | "IBM ILOG CPLEX Optimizer". Webpage https://www.ibm.com/analytics/cplex-optimizer, last accessed Nov. 24, 2021, 7 pages.

Hertzberg, J.B. et al. | "Laser-annealing Josephson junctions for yielding scaled-up superconducting quantum processors". arXiv:2009.00781v4 [quant-ph] Sep. 23, 2020, 16 pages.

Carroll, M. et al. | "Dynamics of superconducting qubit relaxation times". arXiv:2105.15201v1 [quant-ph] May 31, 2021, 10 pages.

Abdurakhimov, L.V. et al. | "Driven-state relaxation of a coupled qubit-defect system in spin-locking measurements". Phys. Rev. B 102, 100502(R)—Published Sep. 3, 2020, 5 pages.

Jurcevic, P. et al. | "Demonstration of quantum vol. 64 on a superconducting quantum computing system". arXiv:2008.08571v2 [quant-ph] Sep. 4, 2020, 7 pages.

Lisenfeld, J. et al. | "Electric field spectroscopy of material defects in transmon qubits". npj Quantum Information (2019) 5:105 ; https://doi.org/10.1038/s41534-019-0224-1, 6 pages.

Burnett, J.J. et al. | "Decoherence benchmarking of superconducting qubits". npj Quantum Information (2019) 5:54 ; https://doi.org/10.1038/s41534-019-0168-5, 8 pages.

Zhang, E.J. et al. | "High-fidelity superconducting quantum processors via laser-annealing of transmon qubits". arXiv:2012.08475v1 [quant-ph] Dec. 15, 2020, 9 pages.

Morvan, A. et al. | "Optimizing frequency allocation for fixed-frequency superconducting quantum processors". arXiv:2112.01634v1 [quant-ph] Dec. 2, 2021, 11 pages.

Li, G. et al. | "Towards Efficient Superconducting Quantum Processor Architecture Design". arXiv:1911.12879v1 [quant-ph] Nov. 28, 2019, 15 pages.

Mell et al., "The NIST Definition of Cloud Computing," Recommendations of the National Institute of Standards and Technology, NIST Special Publication 800-145, Sep. 2011, 7 pages.

International Search Report and Written Opinion received for PCT Application Serial No. PCT/E P2022/086455 dated Mar. 14, 2023, 15 pages.

Wei, K.X. et al. | "Quantum crosstalk cancellation for fast entangling gates and improved multi-qubit performance", arxiv.org, Cornell University Library, 201 Olin Library Cornell University Ithaca, NY 14853, Jun. 1, 2021, 16 pages.

Magnard et al., "Fast and Unconditional All-Microwave Reset of a Superconducting Qubit", https://arxiv.org/abs/1801.07689, Jan. 23, 2018, 9 pages.

Egger et al., "Pulsed Reset Protocol for Fixed-Frequency Superconducting Qubits", https://doi.org/10.1103/PhysRevApplied.10.044030, Apr. 1, 2019, 7 pages.

Klimov et al., "Fluctuations of Energy-Relaxation Times in Superconducting Qubits", https://doi.org/10.48550/arXiv.1809.01043, Mar. 2, 2022, 21 pages.

Mcrae et al., "Reproducible Coherence Characterization of Superconducting Quantum Devices", Appl. Phys. Lett., vol. 119, No. 100501, 2021, 13 pages.

List of IBM Patents and Patent Applications Treated as Related.

Notice of Allowance and Fees Due (PTOL-85) Mailed on Nov. 13, 2024 for U.S. Appl. No. 17/694,051, 8 page(s).

Notice of Allowance and Fees Due (PTOL-85) Mailed on Oct. 21, 2024 for U.S. Appl. No. 17/694,051, 9 page(s).

Non-Final Rejection Mailed on Jun. 30, 2025 for U.S. Appl. No. 17/936,262, 17 page(s).

Coherent Josephson qubit suitable for scalable quantum integrated circuits, Barend et al, 2013 (Year: 2013).

Non-Final Rejection Mailed on Sep. 15, 2025 for U.S. Appl. No. 17/694,063, 12 page(s).

Notice of Allowance for U.S. Appl. No. 17/936,262 dated Oct. 14, 2025.

* cited by examiner

TLS-BASED OPTIMIZATION OF STARK TONE TUNING

BACKGROUND

The subject disclosure relates to Stark tone tuning, and more specifically to facilitating TLS-based optimization of Stark tone tuning.

Frequency collisions in a qubit lattice can cause unpredictable errors to be generated when the qubit lattice is implemented in quantum computing. A promising technique for controlling such frequency collisions is Stark tone tuning. However, determining which qubits in the qubit lattice should be tuned by which Stark tones so as to avoid frequency collisions can be an extremely difficult optimization problem which requires consideration of voluminous, conflicting, and overlapping variables. Existing techniques for making such determinations are generally manual and take into consideration only the most basic type of frequency collisions.

Accordingly, systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate TLS-based optimization of Stark tone tuning are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a receiver component that can access a qubit topology. In various aspects, the computer-executable components can further comprise an optimization component that can identify, based on a set of two-level-system (TLS) frequency regions of the qubit topology, one or more Stark tone frequencies. In various instances, the computer-executable components can further comprise an execution component that can apply, to a qubit lattice corresponding to the qubit topology, one or more Stark tones that have the one or more Stark tone frequencies, thereby eliminating frequency collisions in the qubit lattice.

According to one or more embodiments, a device is provided. The device can comprise a memory that can store computer-executable components. The device can further comprise a processor that can be operably coupled to the memory and that can execute the computer-executable components stored in the memory. In various embodiments, the computer-executable components can comprise a scanning component that can identify, via qubit relaxation spectroscopy, a plurality of two-level-system (TLS) frequency regions associated with a qubit lattice. In various aspects, the computer-executable components can further comprise an optimization component that calculates, based on the plurality of TLS frequency regions, at least one Stark tone frequency that prevents collisions in the qubit lattice. In various instances, the optimization component can identify at least one Stark shift that corresponds to the at least one Stark tone frequency, and the computer-executable components can further comprise an amplitude component that can estimate at least one Stark tone amplitude that, in combination with the at least one Stark tone frequency, causes the at least one Stark shift. In various cases, the computer-executable components can further comprise an execution component that can apply at least one Stark tone to the qubit lattice, according to the at least one Stark tone frequency and the at least one Stark tone amplitude.

According to one or more embodiments, the above-described system can be implemented as a computer-implemented method and/or computer program product.

DETAILED DESCRIPTION

Figure 1:
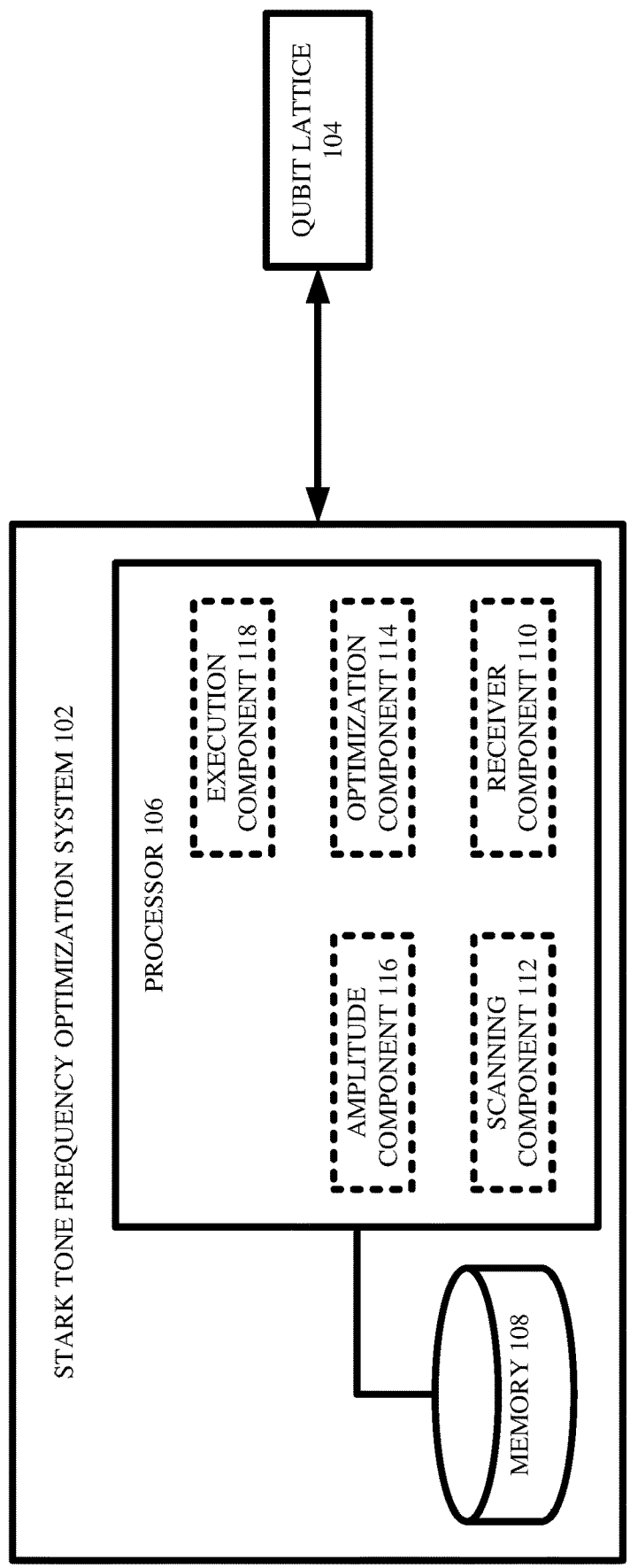
FIG. 1 illustrates a block diagram of an example, non-limiting system that facilitates TLS-based optimization of Stark tone tuning in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A Stark tone can be an off-resonant microwave signal that, when applied to a qubit, can cause one or more transition frequencies of the qubit to shift. For example, as those having ordinary skill in the art will appreciate, a given qubit can have multiple types of transition frequencies denoting the transitions between different energy states (e.g., the given qubit can be associated with at least four transition frequencies: an $f_{01}$ transition frequency; an $f_{02}$ transition frequency; an $f_{02/2}$ transition frequency; and an $f_{12}$ transition frequency), and the values and/or magnitudes of such multiple types of transition frequencies (e.g., as measured in Hertz) can change when the given qubit is exposed to and/or driven by an off-resonant tone. Accordingly, Stark tones, which do not require flux bias lines, can be useful for facilitating post-fabrication dynamic tuning of qubit frequencies.

In various aspects, post-fabrication dynamic tuning can be implemented to eliminate frequency collisions among the qubits that are in a qubit lattice. For instance, if a first qubit in the qubit lattice is experiencing a frequency collision with a second qubit in the qubit lattice, then that frequency collision can be eliminated and/or ameliorated by shifting the transition frequencies of the first qubit via a Stark tone (e.g., so that the transition frequencies of the first qubit no longer collide with those of the second qubit). However, it is possible that shifting the transition frequencies of the first qubit in this way can cause the first qubit to now experience a frequency collision with a third qubit in the qubit lattice (e.g., the transition frequencies of the first qubit can, after shifting, now be colliding with those of the third qubit). Accordingly, as the size of the qubit lattice grows, it can become exponentially more difficult and complicated to determine which particular qubits in the lattice should be driven by which particular Stark tones so as to avoid frequency collisions.

Existing techniques for identifying which Stark tones (e.g., which off-resonant frequencies and amplitudes) to apply to which qubits take into consideration only the most basic type of frequency collision: direct frequency collisions between neighboring qubits. As recognized by the present inventors, such existing techniques fail to take into consideration other important types of frequency collisions, which can cause such existing techniques to yield suboptimal results (e.g., which can cause such existing techniques to identify Stark tones that nevertheless fail to fully eliminate frequency collisions).

Systems and/or techniques that can address one or more of these technical problems can thus be desirable.

Various embodiments of the invention can address one or more of these technical problems. Specifically, various embodiments of the invention can provide systems and/or techniques that can facilitate TLS-based optimization of Stark tone tuning. In particular, a qubit can have a two-level-system (TLS) frequency region. In various aspects, a TLS frequency region can be considered as a frequency interval and/or frequency range in which the qubit experiences excessive randomized noise. That is, if the transition frequencies of the qubit are within such TLS frequency region, the qubit can be considered as experiencing a TLS frequency collision and can exhibit significantly deteriorated coherence. On the other hand, if the transition frequencies of the qubit are outside of such TLS frequency region (e.g., above or below the TLS frequency region), the qubit can refrain from exhibiting such deteriorated coherence.

The present inventors recognized that existing techniques for facilitating Stark tone tuning take into consideration only direct frequency collisions between neighboring qubits and fail to take into consideration TLS frequency collisions. In other words, when existing techniques identify which particular Stark tones (e.g., which particular frequencies, amplitudes, and shifts) should be applied to which particular qubits in a qubit lattice so as to avoid frequency collisions, the identified Stark tones can successfully cause the qubits to avoid direct qubit-to-qubit frequency collisions, but such identified Stark tones can fail to prevent TLS frequency collisions. That is, such identified Stark tones can cause the transition frequencies of one or more qubits in the qubit lattice to enter TLS frequency regions, which can correspondingly cause the qubit lattice to exhibit increased decoherence. Accordingly, to address this significant shortcoming of existing techniques, the present inventors devised various embodiments described herein which can facilitate TLS-based optimization of Stark tone tuning.

Various embodiments described herein can be considered as a computerized tool (e.g., any suitable combination of computer-executable hardware and/or computer-executable software) that can electronically facilitate TLS-based optimization of Stark tone tuning. In various aspects, such a computerized tool can comprise a receiver component, a scanning component, an optimization component, an amplitude component, and/or an execution component.

In various embodiments, there can be a qubit lattice. In various aspects, the qubit lattice can include any suitable number of qubits (e.g., superconducting qubits such as transmons) fabricated on any suitable quantum substrate (e.g., silicon wafer). In various instances, the qubits in the qubit lattice can be arranged and/or coupled together in any suitable fashion (e.g., can be coupled together in a heavy-hexagonal arrangement, can be coupled together in a rectilinear arrangement). In various cases, it can be desired to perform Stark tone tuning on the qubit lattice. Accordingly, it can be desired to identify which specific qubits of the qubit lattice (e.g., each qubit can have a unique identifier) should be exposed to and/or otherwise driven by which specific Stark tones (e.g., Stark tones can differ according to tone frequency, tone amplitude, and/or resulting frequency shift), such that frequency collisions of the qubit lattice are eliminated and/or minimized. As described herein, the computerized tool can facilitate such Stark tone tuning so as to eliminate not only direct frequency collisions between neighboring qubits but also TLS frequency collisions for each individual qubit.

In various embodiments, the receiver component of the computerized tool can electronically receive and/or otherwise electronically access a qubit topology that corresponds to the qubit lattice. In various aspects, the receiver component can electronically retrieve the qubit topology from any suitable centralized and/or decentralized database (e.g., graph database, relational database, hybrid database), whether remote from and/or local to the receiver component. In various other aspects, the receiver component can electronically retrieve the qubit topology from any other suitable computing device and/or computing devices. In any case, the receiver component can electronically obtain and/or access the qubit topology such that other components of the computerized tool can electronically interact with (e.g., read, write, edit, manipulate) the qubit topology.

In various aspects, the qubit topology can be a graph comprised of vertices and edges. In various instances, the vertices of the qubit topology can represent the qubits of the qubit lattice, and the edges of the qubit topology can represent the qubit-to-qubit couplings of the qubit lattice. In other words, each vertex of the qubit topology can represent a respectively corresponding qubit in the qubit lattice, and the edges of the qubit topology can indicate which qubits of the qubit lattice are coupled together (e.g., the edges can indicate which qubits of the qubit lattice are neighbors). In various instances, the vertices of the qubit topology can be tagged with any suitable qubit characteristics, such as transition frequency values. For example, if a given vertex in the qubit topology corresponds to a given qubit, then the given vertex can be tagged with (e.g., can indicate) an $f_{01}$ transition frequency value of the given qubit, an $f_{02}$ transition frequency value of the given qubit, an $f_{02/2}$ transition frequency value of the given qubit, an $f_{12}$ transition frequency value of the given qubit, and/or an anharmonicity value of the given qubit. In any case, the qubit topology can indicate how many qubits are in the qubit lattice, can indicate a unique identifier for each qubit in the qubit lattice, can indicate how such qubits are coupled and/or arranged together, and/or can indicate what the transition frequencies of such qubits are.

In various embodiments, the scanning component of the computerized tool can electronically identify a set of TLS frequency regions associated with the qubit topology and/or with the qubit lattice. In particular, in various aspects, the scanning component can electronically control and/or otherwise electronically access any suitable quantum spectroscopy equipment and/or quantum spectroscopy scanners that are electronically integrated with the qubit lattice. Accordingly, in various instances, the scanning component can utilize such quantum spectroscopy equipment and/or quantum spectroscopy scanners to electronically apply qubit relaxation spectroscopy (e.g., to electronically apply a $T_1$ spectroscopy experiment, such as the inversion recovery experiment with Stark tones) to each qubit of the qubit lattice. As those having ordinary skill in the art will appreciate, application of qubit relaxation spectroscopy to a given qubit in the qubit lattice can reveal one or more TLS frequency regions of that given qubit. In other words, the scanning component can sweep the operational frequency of the given qubit through any suitable range of values (e.g., by applying Stark tones to the given qubit with varying amplitudes and/or varying durations), and the relaxation time (e.g., $T_1$ time) of the given qubit can be measured and/or probed for each swept operational frequency value. Thus, the scanning component can identify one or more operational frequency intervals and/or ranges that cause the relaxation time of the given qubit to dramatically decrease (e.g., to decrease by any suitable threshold margin), and the scanning component can label/mark such identified one or more operational frequency intervals and/or ranges as one or more TLS frequency regions of the given qubit. In various cases, the scanning component can repeat such sweeping and/or probing for each qubit of the qubit lattice, thereby yielding the set of TLS frequency regions (e.g., one or more TLS frequency regions per qubit, where such one or more TLS frequency regions can be considered as transition frequency values that should be avoided).

In some cases, the qubit topology can already indicate one or more TLS frequency regions for each qubit in the qubit lattice. In such cases, the scanning component can be omitted.

In various embodiments, the optimization component of the computerized tool can electronically store, electronically maintain, electronically control, and/or otherwise electronically access any suitable optimizer. In various aspects, the optimizer can be any suitable solver and/or computer software program that can compute optimal solutions for one or more objective functions when given one or more mathematical constraints which the objective functions must satisfy. As a non-limiting example, the optimizer can be CPLEX. However, as those having ordinary skill in the art will appreciate, the optimizer can be any other suitable linear and/or nonlinear mixed integer programming solver as desired.

In various instances, the optimization component can electronically define a set of collision constraints, based on the qubit topology and based on the set of TLS frequency regions. In various cases, the set of collision constraints can include a set of TLS collision constraints. In various aspects, the set of TLS collision constraints can include any suitable number of mathematical equations and/or mathematical inequalities for each given qubit in the qubit lattice, where satisfaction of such equations and/or inequalities ensures that the given qubit does not experience a TLS frequency collision (e.g., ensures that the transition frequencies of the given qubit are not shifted into any TLS frequency region of that given qubit). In various instances, the set of collision constraints can also include a set of qubit-to-qubit collision constraints. In various cases, the set of qubit-to-qubit collision constraints can include any suitable number of mathematical equations and/or mathematical inequalities for each given qubit in the qubit lattice, where satisfaction of such equations and/or inequalities ensures that the given qubit does not experience a direct frequency collision with a neighboring qubit (e.g., ensures that the transition frequencies of the given qubit are not shifted too close to the transition frequencies of any nearest-neighbor and/or next-nearest-neighbor). In various aspects, the set of collision constraints can further include a set of tone-to-qubit collision constraints. In various instances, the set of tone-to-qubit collision constraints can include any suitable number of mathematical equations and/or mathematical inequalities for each given qubit in the qubit lattice, where satisfaction of such equations and/or inequalities ensures that the frequency of a Stark tone that is applied to the given qubit is not too close to the transition frequencies of the given qubit, is not too close to the transition frequencies of neighbors of the given qubit, and/or is not within a TLS frequency region of the given qubit.

In various embodiments, the optimization component can further electronically define a set of objective functions. In various aspects, the set of objective functions can include an objective function that computes the total number of Stark tones that are applied to the qubit lattice. In various instances, the set of objective functions can also include an objective function that computes the total amount of frequency shifts that are caused by the total number of Stark tones (e.g., this can be computed linearly so that mixed-integer linear programming can be applied by the optimizer, and/or this can be computed quadratically, so that mixed-integer quadratic programming can be applied by the optimizer). In various cases, the set of objective functions can further include an objective function that computes the total number of entangling gate flips that are associated with the total number of Stark tones (e.g., a default entangling gate direction can be defined as having a control qubit with a higher transition frequency than a target qubit; so, an entangling gate direction flip can be considered as occurring if a control qubit has a lower transition frequency than the target qubit). In various aspects, the set of objective functions can also include an objective function that returns the smallest collision margin caused by the total number of Stark tones (e.g., a collision margin can be the distance between the transition frequencies of any two neighboring qubits, can be the distance between a transition frequency of a qubit and a TLS frequency region of the qubit, can be a distance between a transition frequency of a qubit and the frequency of a Stark tone that is applied to the qubit, can be a distance between a transition frequency of a qubit and the frequency of a Stark tone that is applied to a neighbor of the qubit, and/or can be a distance between the frequency of a Stark tone that is applied to a qubit and a TLS region of that qubit).

In various embodiments, after the optimization component defines the set of collision constraints and the set of objective functions, the optimization component can electronically execute the optimizer, thereby yielding a set of Stark tone frequencies and a set of Stark shifts that provide optimal solutions for the set of objective functions while simultaneously satisfying the set of collision constraints. In other words, the optimizer can identify and/or calculate: which qubits of the qubit lattice should be tuned by a Stark tone so as to maximize/minimize the set of objective functions while satisfying each of the set of collision constraints (e.g., the number of tuned qubits can be less than the total number of qubits in the qubit lattice); how much of a frequency shift each of such tuned qubits should experience so as to maximize/minimize the set of objective functions while satisfying each of the set of collision constraints; and what frequency the Stark tone applied to each of such tuned qubits should be so as to maximize/minimize the set of objective functions while satisfying each of the set of collision constraints. In various cases, the set of Stark tone frequencies and the set of Stark shifts can be considered as minimizing the objective function that computes the total number of Stark tones that are applied to the qubit lattice, minimizing the objective function that computes the total amount of frequency shifts that are caused by the total number of Stark tones, minimizing the objective function that computes the total number of entangling gate flips that are associated with the total number of Stark tones, and/or maximizing the objective function that returns the smallest collision margin caused by the total number of Stark tones, all while satisfying each of the set of collision constraints.

In various cases, the set of Stark tone frequencies and the set of Stark shifts can be considered as respectively corresponding to each other. For example, if the set of Stark tone frequencies includes s frequency values for any suitable positive integer s that is less than or equal to the total number of qubits in the qubit lattice, then the set of Stark shifts can include s respectively corresponding shift values. This can indicate that s qubits in the qubit lattice are to be subjected to Stark tone tuning, which can be facilitated by s Stark tones (e.g., one Stark tone per tuned qubit). More specifically, for any suitable positive integer c that is less than or equal to s, the c-th qubit that is to be subjected to Stark tone tuning can be driven by a Stark tone the frequency of which is equal to the c-th frequency value in the set of Stark tone frequencies, and such c-th qubit can experience a shift in transition frequency that is equal to the c-th shift value in the set of Stark shifts.

In any case, the set of Stark tone frequencies and the set of Stark shifts can be considered as optimized parameters that can facilitate Stark tone tuning of the qubit lattice so as to avoid frequency collisions (e.g., TLS frequency collisions, qubit-to-qubit frequency collisions, and tone-to-qubit frequency collisions).

In various embodiments, the amplitude component of the computerized tool can electronically compute a set of Stark tone amplitudes based on the set of Stark tone frequencies and the set of Stark shifts. As those having ordinary skill in the art will appreciate, a Stark tone can be considered as having three interrelated parameters/characteristics: frequency, amplitude, and resulting shift. Accordingly, when given any two of such three parameters/characteristics, the third can be computed analytically and/or experimentally as desired. Thus, for each frequency-shift pair that is defined by the set of Stark tone frequencies and the set of Stark shifts, the amplitude component can calculate a corresponding Stark tone amplitude, thereby yielding a set of Stark tone amplitudes. Returning to the above non-limiting example, if the set of Stark tone frequencies has s frequency values and if the set of Stark shifts has s shift values, then the set of Stark tone amplitudes can have s amplitude values (e.g., such that the c-th qubit that is to be subjected to Stark tone tuning can be driven by a Stark tone whose frequency is equal to the c-th frequency value in the set of Stark tone frequencies, whose amplitude is equal to the c-th amplitude value in the set of Stark tone amplitudes, and which causes a transition frequency of the c-th qubit to shift by the c-th shift value in the set of Stark shifts). Accordingly, the set of Stark tone frequencies, the set of Stark shifts, and the set of Stark tone amplitudes can be considered as collectively defining a set of Stark tones which can be applied to the qubit lattice so as to eliminate frequency collisions, including TLS frequency collisions, of the qubit lattice.

In various embodiments, the execution component of the computerized tool can electronically apply, via any suitable waveform generators, the set of Stark tones to the qubit lattice, thereby eliminating and/or preventing frequency collisions in the qubit lattice.

Accordingly, various embodiments described herein can include a computerized tool that can electronically determine which qubits in a qubit lattice should be subjected to Stark tone tuning so as to avoid frequency collisions, based on TLS frequency regions of the qubit lattice.

Various embodiments of the invention can be employed to use hardware and/or software to solve problems that are highly technical in nature (e.g., to facilitate TLS-based optimization of Stark tone tuning), that are not abstract and that cannot be performed as a set of mental acts by a human. Further, some of the processes performed can be performed by a specialized computer (e.g., optimizer and/or solver that maximizes/minimizes objective functions based on given constraints). In various aspects, some defined tasks associated with various embodiments of the invention can include: accessing, by a device operatively coupled to a processor, a qubit topology; identifying, by the device and based on a set of two-level-system (TLS) frequency regions of the qubit topology, one or more Stark tone frequencies; and applying, by the device and to a qubit lattice corresponding to the qubit topology, one or more Stark tones that have the one or more Stark tone frequencies, thereby eliminating frequency collisions in the qubit lattice. Neither the human mind nor a human with pen and paper can electronically receive a qubit topology, electronically generate collision constraints based on TLS frequency regions of the qubit topology, electronically execute an optimizer/solver to identify Stark tones that satisfy such collision constraints, and electronically apply the Stark tones to a qubit lattice associated with the qubit topology. Instead, such defined tasks are inherently and inextricably tied to computer technology and cannot be implemented outside of a computing environment (e.g., an optimizer/solver is a specialized piece of computing software that mathematically optimizes one or more given objective functions based on one or more given constraints; a computerized tool that leverages such an optimizer/solver to identify optimal Stark tones with which to dynamically tune a qubit lattice is likewise inherently computerized and cannot be implemented in any sensible, practicable, or reasonable way without computers).

In various instances, one or more embodiments described herein can be integrated into a practical application. Indeed, as described herein, various embodiments of the invention, which can take the form of systems and/or computer-implemented methods, can be considered as a computerized tool that can electronically facilitate TLS-based optimization of Stark tone tuning. As mentioned above, existing techniques for identifying which Stark tones to apply to which qubits in a qubit lattice completely ignore TLS frequency regions of the qubits. Accordingly, when Stark tones are identified via such existing techniques, application of such identified Stark tones to the qubit lattice can cause TLS frequency collisions in the qubit lattice (e.g., can shift a qubit's transition frequencies into its TLS frequency regions), which can manifest as significantly degraded coherence times. In stark contrast, the computerized tool described herein can identify Stark tones based on TLS frequency regions. Accordingly, when such identified Stark tones are applied to a qubit lattice, such identified Stark tones can refrain from causing TLS frequency collisions (e.g., can refrain from shifting a qubit's transition frequencies into its TLS frequency regions). Thus, the significantly degraded coherence times associated with existing techniques can be avoided. Those having ordinary skill in the art will appreciate that this is a concrete and tangible technical improvement in the field of Stark tone tuning. For at least these reasons, such a computerized tool certainly constitutes a useful and practical application of computers.

Moreover, it must be emphasized that various embodiments described herein are not directed to mere transitory signals and/or propagating waveforms. As explained herein, various embodiments of the invention can help to facilitate improved Stark tone tuning as compared to existing techniques. Specifically, the present inventors realized that existing techniques for identifying which Stark tones to apply to which qubits can produce excessive coherence degradation because such existing techniques ignore TLS frequency regions. Accordingly, the embodiments described herein identify which Stark tones (e.g., which frequencies, amplitudes, and/or shifts) to apply to which qubits by taking TLS frequency regions into account. Thus, when Stark tone tuning is implemented in accordance with various embodiments described herein, less coherence degradation can be experienced, which is a concrete and tangible benefit. Those having ordinary skill in the art will appreciate that it is not possible to intelligently discuss various embodiments of the invention without describing/discussing microwave signals such as Stark tones and/or without discussing the frequencies and amplitudes of such microwave signals. Despite such description/discussion of microwave signals, various embodiments of the invention are not directed to transitory signals and/or propagating waveforms by themselves. Instead, such embodiments are directed to computerized hardware and/or computerized software that can electronically perform computations so as to identify optimized parameters (e.g., optimized frequency values, optimized amplitude values, optimized shift values) for facilitating Stark tone tuning based on TLS-frequency regions, and which can actually perform such Stark tone tuning on real-world qubits by electronically controlling real-world waveform generators.

It should be appreciated that the figures and the herein disclosure describe non-limiting examples of various embodiments of the invention.

FIG. 1 illustrates a block diagram of an example, non-limiting system 100 that can facilitate TLS-based optimization of Stark tone tuning in accordance with one or more embodiments described herein. In various aspects, a Stark tone frequency optimization system 102 can be electronically integrated, via any suitable wired and/or wireless electronic connections, with a qubit lattice 104.

In various embodiments, the qubit lattice 104 can include any suitable number of qubits that are fabricated on any suitable quantum computing substrate, such as a silicon wafer. In various aspects, any suitable types of qubits can be implemented in the qubit lattice 104, such as superconducting qubits (e.g., charge qubits, phase qubits, flux qubits, transmon qubits) and/or quantum dots. In various instances, the qubits of the qubit lattice 104 can exhibit any suitable coupling pattern and/or coupling arrangement. As some non-limiting examples, the qubit lattice 104 can exhibit a heavy-hexagonal coupling arrangement, a rectilinear coupling arrangement, a triangular coupling arrangement, and/or any other suitably-shaped coupling arrangement as desired. As those having ordinary skill in the art will appreciate, the qubit lattice 104 can be manufactured via any suitable microfabrication and/or nanofabrication techniques (e.g., photolithography, deposition, double-angle evaporation).

In any case, it can be desired to perform Stark tone tuning on the qubit lattice 104 so as to mitigate and/or eliminate frequency collisions in the qubit lattice 104. In other words, it can be desired to identify which subset of qubits of the qubit lattice 104 should be tuned via a Stark tone; for each given qubit of such subset of qubits, it can be desired to identify the frequency and amplitude of the Stark tone that should applied to the given qubit; and for each given qubit of such subset of qubits, it can be desired to identify the resulting shift in transition frequency of the given qubit. As described herein, the Stark tone frequency optimization system 102 can facilitate such Stark tone tuning.

In various embodiments, the Stark tone frequency optimization system 102 can comprise a processor 106 (e.g., computer processing unit, microprocessor) and a computer-readable memory 108 that is operably connected and/or coupled to the processor 106. The memory 108 can store computer-executable instructions which, upon execution by the processor 106, can cause the processor 106 and/or other components of the Stark tone frequency optimization system 102 (e.g., receiver component 110, scanning component 112, optimization component 114, amplitude component 116, execution component 118) to perform one or more acts. In various embodiments, the memory 108 can store computer-executable components (e.g., receiver component 110, scanning component 112, optimization component 114, amplitude component 116, execution component 118), and the processor 106 can execute the computer-executable components.

In various embodiments, the Stark tone frequency optimization system 102 can comprise a receiver component 110. In various aspects, as described herein, the receiver component 110 can electronically access a qubit topology that is associated with the qubit lattice 104.

In various embodiments, the Stark tone frequency optimization system 102 can further comprise a scanning component 112. In various instances, as described herein, the scanning component 112 can electronically identify a set of TLS frequency regions associated with the qubit lattice 104 and/or with the qubit topology.

In various embodiments, the Stark tone frequency optimization system 102 can comprise further comprise an optimization component 114. In various cases, as described herein, the optimization component 114 can electronically define a set of collision constraints and a set of objective functions based on the set of TLS frequency regions and based on the qubit topology, and can electronically execute an optimizer on the set of collision constraints and the set of objective functions, thereby yielding a set of Stark tone frequencies and a set of Stark shifts.

In various embodiments, the Stark tone frequency optimization system 102 can further comprise an amplitude component 116. In various aspects, as described herein, the amplitude component 116 can electronically compute a set of Stark tone amplitudes based on the set of Stark tone frequencies and the set of Stark shifts. In various cases, the set of Stark tone frequencies, the set of Stark shifts, and the set of Stark tone amplitudes can be considered as collectively defining a set of Stark tones that can be applied to the qubit lattice 104 so as to mitigate and/or eliminate frequency collisions, including TLS frequency collisions, in the qubit lattice 104.

In various embodiments, the Stark tone frequency optimization system 102 can further comprise an execution component 118. In various instances, as described herein, the execution component 118 can electronically apply the set of Stark tones to the qubit lattice 104, thereby ameliorating frequency collisions, including TLS frequency collisions, in the qubit lattice 104. In other words, the execution component 118 can electronically perform Stark tone tuning on the qubit lattice 104, according to the set of Stark tones.

Figure 2:
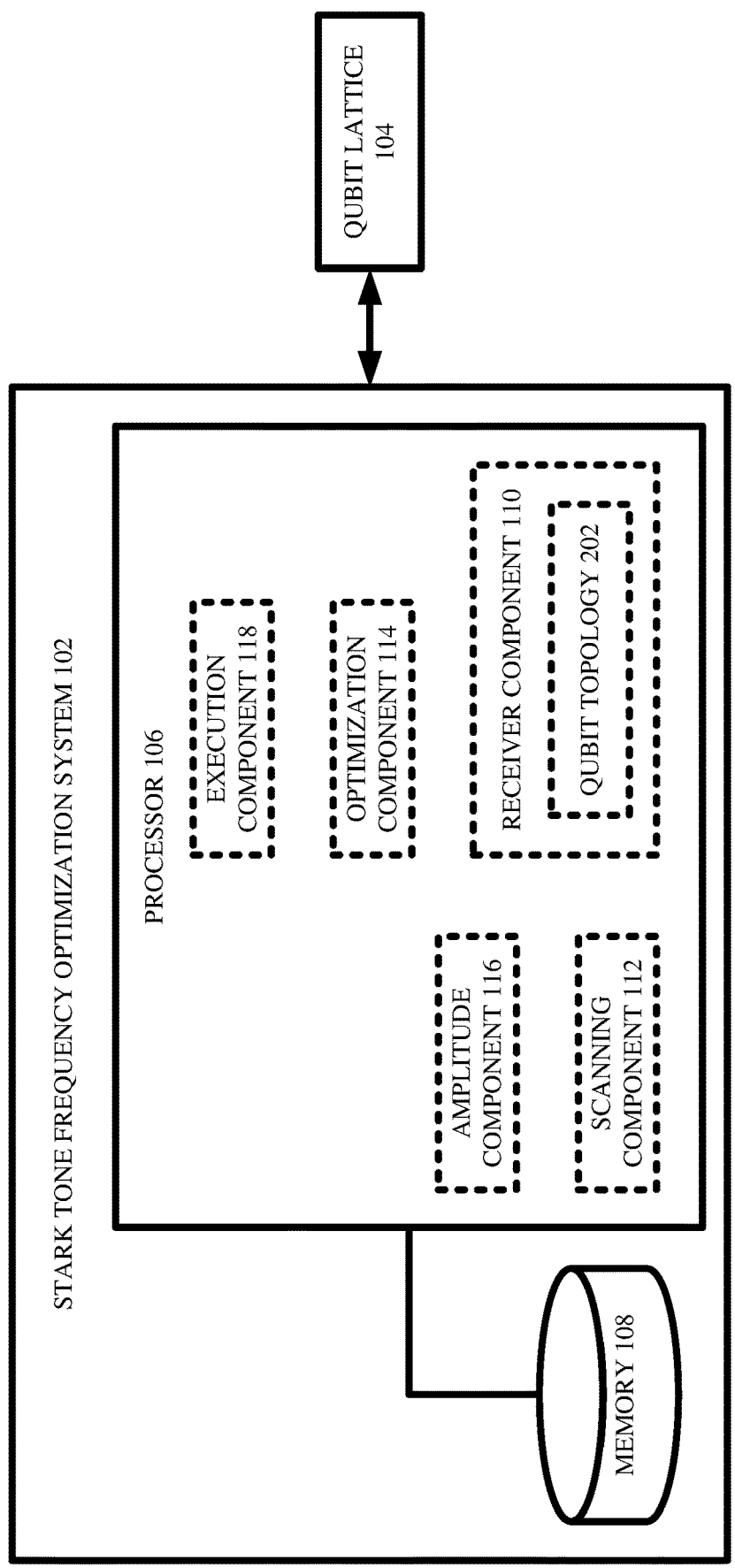
FIG. 2 illustrates a block diagram of an example, non-limiting system including a qubit topology that facilitates TLS-based optimization of Stark tone tuning in accordance with one or more embodiments described herein.

FIG. 2 illustrates a block diagram of an example, non-limiting system 200 including a qubit topology that can facilitate TLS-based optimization of Stark tone tuning in accordance with one or more embodiments described herein. As shown, the system 200 can, in some cases, comprise the same components as the system 100, and can further comprise a qubit topology 202.

In various embodiments, the receiver component 110 can electronically receive and/or otherwise electronically access the qubit topology 202. In various aspects, the receiver component 110 can electronically retrieve the qubit topology 202 from any suitable database (not shown) as desired, whether centralized and/or decentralized. In various other aspects, the receiver component 110 can electronically retrieve the qubit topology 202 from any other suitable computing device (not shown) as desired. In any case, the receiver component 110 can electronically obtain and/or access the qubit topology 202, so that other components of the Stark tone frequency optimization system 102 can electronically interact with the qubit topology 202.

Figure 3:
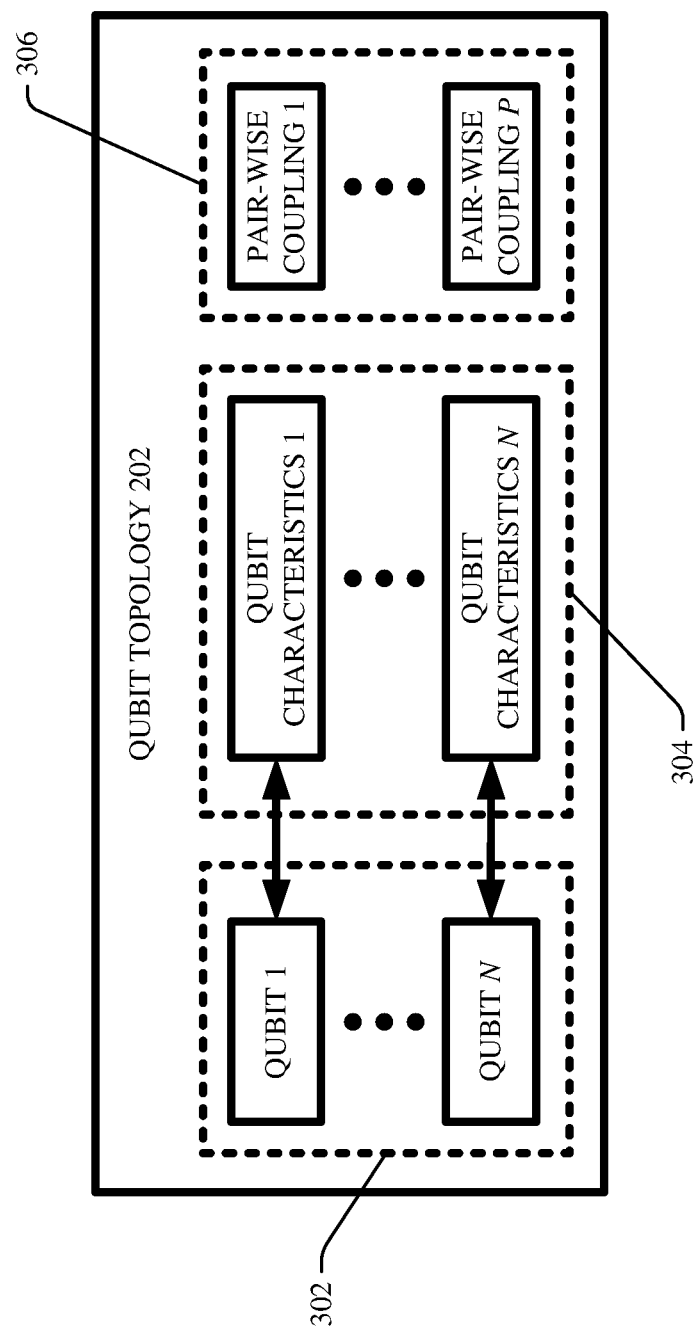
FIG. 3 illustrates an example, non-limiting block diagram of a qubit topology in accordance with one or more embodiments described herein.

FIG. 3 illustrates an example, non-limiting block diagram 300 of a qubit topology in accordance with one or more embodiments described herein. In other words, FIG. 3 depicts a non-limiting example embodiment of the qubit topology 202.

In various aspects, as shown, the qubit topology 202 can indicate and/or identify a set of qubits 302, a set of qubit characteristics 304, and/or a set of pair-wise couplings 306. In various instances, the set of qubits 302 can be considered as identifying each of the qubits of the qubit lattice 104. As shown, the set of qubits 302 can include n qubits for any suitable positive integer n: a qubit 1 to a qubit n. Accordingly, this can mean that the qubit lattice 104 includes n qubits in total: the qubit 1 to the qubit n.

In various cases, as shown, the set of qubit characteristics 304 can include n groups of qubit characteristics: a group of qubit characteristics 1 to a group of qubit characteristics n. In various aspects, the set of qubit characteristics 304 can respectively correspond to the set of qubits 302. For example, the group of qubit characteristics 1 can correspond to the qubit 1. In other words, the group of qubit characteristics 1 can be considered as identifying and/or indicating any suitable features and/or any suitable parameters of the qubit 1. For instance, the group of qubit characteristics 1 can indicate an $f_{01}$ transition frequency of the qubit 1, an $f_{02}$ transition frequency of the qubit 1, an $f_{02/2}$ transition frequency of the qubit 1, an $f_{12}$ transition frequency of the qubit 1, and/or an anharmonicity of the qubit 1. As another example, the group of qubit characteristics n can correspond to the qubit n. That is, the group of qubit characteristics n can be considered as identifying and/or indicating any suitable features and/or any suitable parameters of the qubit n. For instance, the group of qubit characteristics n can indicate an $f_{01}$ transition frequency of the qubit n, an $f_{02}$ transition frequency of the qubit n, an $f_{02/2}$ transition frequency of the qubit n, an $f_{12}$ transition frequency of the qubit n, and/or an anharmonicity of the qubit n.

In various aspects, as shown, the set of pair-wise couplings 306 can include p couplings for any suitable positive integer p: a pair-wise coupling 1 to a pair-wise coupling p. In various instances, each of the set of pair-wise couplings 306 can be considered as representing a coupling and/or a connection between two neighboring qubits in the qubit lattice 104. For example, the pair-wise coupling 1 can be considered as representing that a first pair of qubits in the qubit lattice 104 are coupled together, and the pair-wise coupling p can be considered as representing that a p-th pair of qubits in the qubit lattice 104 are coupled together. Accordingly, in various cases, the set of pair-wise couplings 306 can be considered as indicating and/or identifying which qubits of the qubit lattice 104 are neighbors with each other.

Thus, as shown, the qubit topology 202 can be considered as indicating and/or identifying the qubits that are in the qubit lattice 104, the transition frequencies and/or anharmonicities of the qubits that are in the qubit lattice 104, and which qubits of the qubit lattice 104 are coupled to each other. In other words, the qubit topology 202 can be considered as describing and/or defining the topology and/or connectivity of the qubit lattice 104.

In various aspects, the qubit topology 202 can be formulated as a graph comprising vertices and edges. For instance, the qubit topology 202 can, in some cases, be represented by an undirected graph G=(V, E), where V={1, ..., n} can represent the set of qubits 302, and where E={$e_1$, ..., $e_p$} can represent the set of pair-wise couplings 306. In various cases, each of the vertices can be tagged with a respectively corresponding group of qubit characteristics from the set of qubit characteristics 304. That is, for any suitable positive integer i≤n in the undirected graph G, the vertex i in V can be tagged with a transition frequency $f_{i,01}$, a transition frequency $f_{i,02}$, a transition frequency $f_{i,02/2}$, a transition frequency $f_{i,12}$, and an anharmonicity $\alpha_i$. In other words, $\alpha_i$ can represent the anharmonicity of the qubit i, and $f_{i,X}$ where X∈{01, 02, 02/2, 12} can represent the transition frequencies of the qubit i. In various aspects, such transition frequencies can be correlated as follows:

$$f_{i,12}=f_{i,01}+\alpha_i$$

$$f_{i,02}=2f_{i,01}+\alpha_i$$

$$f_{i,02/2}=f_{i,01}+\alpha_i/2$$

In various instances, N(i)={j|(i,j)∈E} can denote a set of neighbors of the qubit i in the undirected graph G, for any suitable positive integer i≤n.

In various aspects, it can be the case that all neighboring qubits in the undirected graph G have different $f_{01}$ transition frequencies. In various cases, for each edge e=(i,j)∈E, a default entangling gate direct (e.g., CNOT direction) can be given as follows: the qubit i can be the control qubit and the qubit j can be the target qubit, if $f_{i,01}>f_{j,01}$; and the qubit i can be the target qubit and the qubit j can be the control qubit, if $f_{i,01}<f_{j,01}$. As those having ordinary skill in the art will appreciate, this can be considered as the default entangling gate direction, since it can be quicker and/or more efficient to utilize control qubits that have higher $f_{01}$ transition frequencies than target qubits. If a control qubit were to have a lower $f_{01}$ transition frequency than a target qubit, an entangling gate can still be applied, but more time can be consumed by the entangling gate. Accordingly, in various aspects, the undirected graph G can be converted to a directed graph G'=(V, E') by extracting all edges that have the default entangling gate direction. In other words, E'={(i,j)|(i,j)∈E and $f_{i,01}>f_{j,01}$}.

As described herein, the qubit lattice 104 can be considered as an already-fabricated qubit lattice. Accordingly, in some cases, the qubit topology 202 can be obtained by measuring (e.g., via any suitable quantum experimentation, spectroscopy, and/or probing techniques) the actual characteristics (e.g., actual transition frequencies) of the fabricated qubits that make up the qubit lattice 104. In some instances, however, various embodiments of the invention can be implemented prior to fabrication of the qubit lattice 104. That is, the qubit topology 202 can, in such instances, be considered as representing a planned, desired, and/or otherwise pre-fabrication topology of the qubit lattice 104. In such case, the transition frequencies listed in the qubit topology 202 can be desired and/or planned transition frequencies that are expected to be exhibited by the qubit lattice 104 when the qubit lattice 104 is fabricated.

Figure 4:
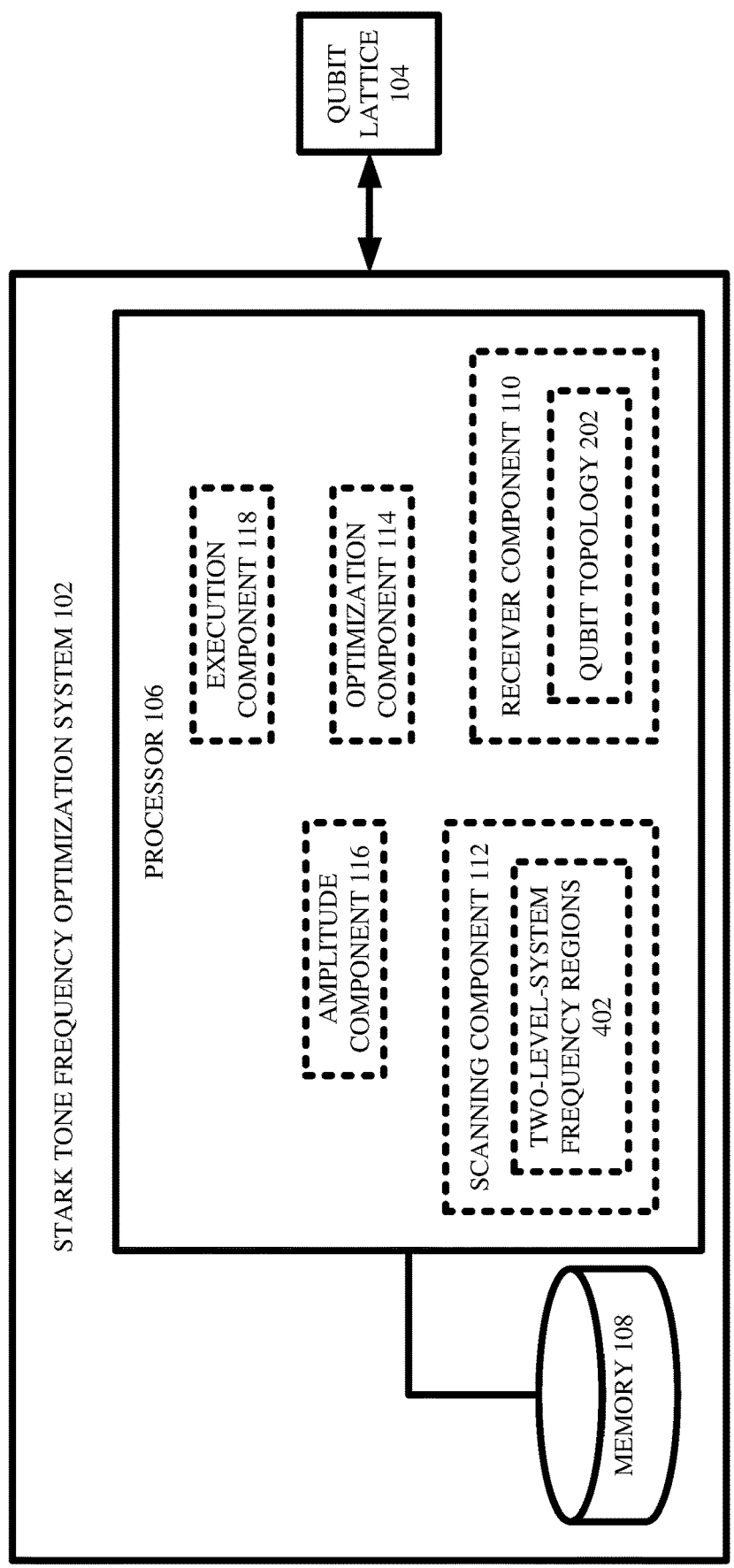
FIG. 4 illustrates a block diagram of an example, non-limiting system including a set of two-level-system (TLS) frequency regions that facilitates TLS-based optimization of Stark tone tuning in accordance with one or more embodiments described herein.

FIG. 4 illustrates a block diagram of an example, non-limiting system 400 including a set of two-level-system (TLS) frequency regions that can facilitate TLS-based optimization of Stark tone tuning in accordance with one or more embodiments described herein. As shown, the system 400 can, in some cases, comprise the same components as the system 200, and can further comprise a set of two-level-system (TLS) frequency regions 402.

In various embodiments, the scanning component 112 can electronically control and/or otherwise electronically access any suitable quantum spectroscopy equipment/scanners (not shown) that are electronically integrated with the qubit lattice 104. In various aspects, the scanning component 112 can electronically apply qubit relaxation spectroscopy to each qubit of the qubit lattice 104, by executing the quantum spectroscopy equipment/scanners. As those having ordinary skill in the art will understand, application of qubit relaxation spectroscopy (e.g., application of a $T_1$ spectroscopy experiment such as the inversion recovery experiment) to a particular qubit of the qubit lattice 104 can reveal TLS frequency regions of that particular qubit. That is, the scanning component 112 can electronically sweep the particular qubit through any suitable range of operational frequencies (e.g., by applying Stark tones to that particular qubit with varying amplitudes and/or durations), and the scanning component 112 can measure and/or probe the relaxation time (e.g., $T_1$ time) of the particular qubit for each swept operational frequency value. Accordingly, the scanning component 112 can identify any operational frequency intervals in which the particular qubit exhibits significantly decreased relaxation times (e.g., in which the relaxation time drops below any suitable threshold value, and/or in which the relaxation time decreases by any suitable threshold percentage). In various cases, such identified operational frequency intervals can be considered as the TLS frequency regions of the particular qubit (e.g., can be considered as frequency regions that should be avoided to preserve the coherence of the particular qubit). In various aspects, the scanning component 112 can repeat such sweeping and/or probing for each qubit in the qubit lattice 104, thereby yielding the set of TLS frequency regions 402.

Those having ordinary skill in the art will appreciate that the scanning component 112 can implement any suitable qubit relaxation spectroscopy technique to identify the set of TLS frequency regions 402, such as a Stark pulse spectroscopy technique, a Stark continuous waveform spectroscopy technique, and/or a spin locking spectroscopy technique. Furthermore, those having ordinary skill in the art will appreciate that, in various cases, the scanning component 112 can implement scipy algorithms to identify the set of TLS frequency regions 402.

Figure 5:
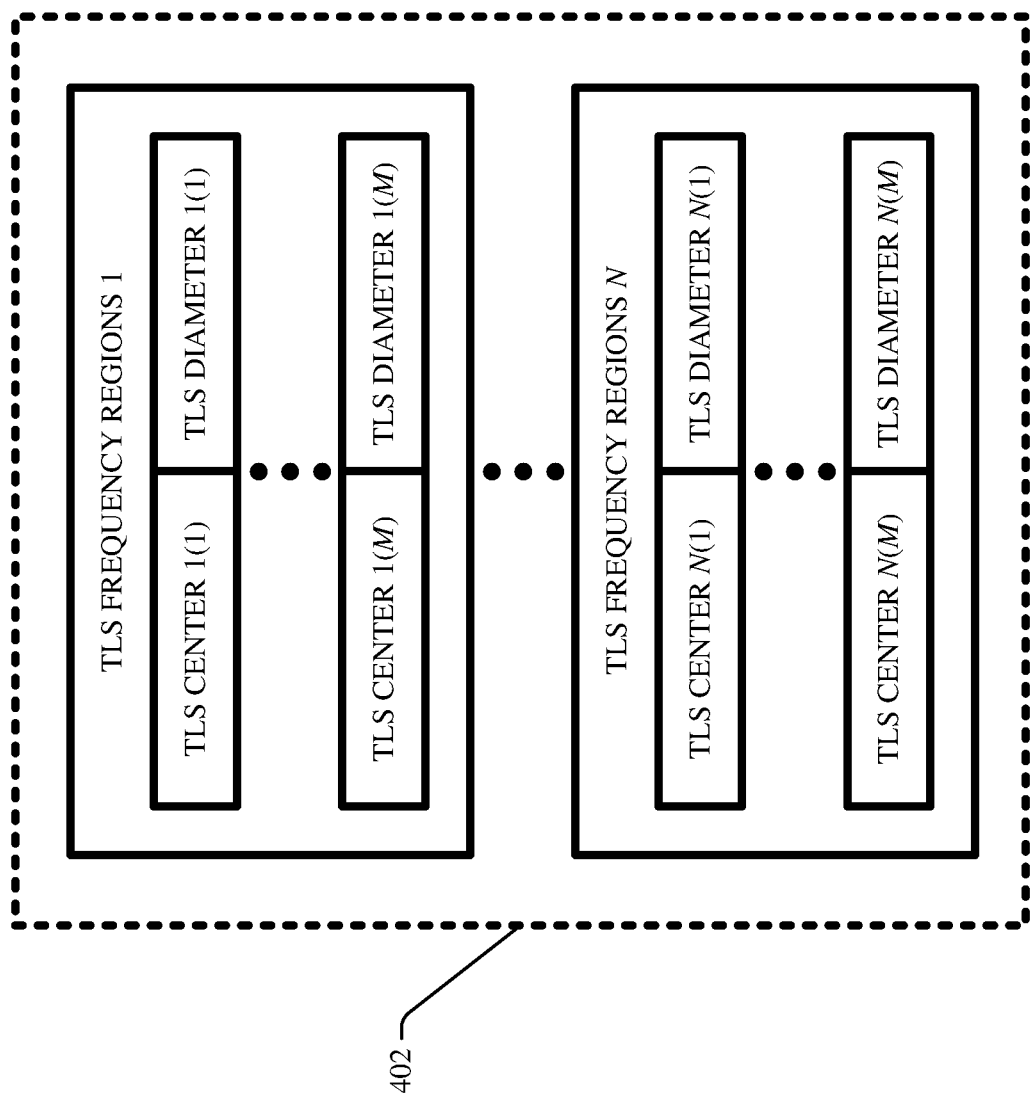
FIG. 5 illustrates an example, non-limiting block diagram of a set of TLS frequency regions in accordance with one or more embodiments described herein.

FIG. 5 illustrates an example, non-limiting block diagram 500 of a set of TLS frequency regions in accordance with one or more embodiments described herein. That is, FIG. 5 depicts a non-limiting example embodiment of the set of TLS frequency regions 402.

As shown, the set of TLS frequency regions 402 can include n groups of TLS frequency regions: a group of TLS frequency regions 1 to a group of TLS frequency regions n. In various aspects, the group of TLS frequency regions 1 can correspond to the qubit 1. In other words, the group of TLS frequency regions 1 can be obtained by performing qubit relaxation spectroscopy on the qubit 1 of the qubit lattice 104. In various aspects, the group of TLS frequency regions 1 can include m regions for any suitable positive integer m: a first TLS frequency region that is defined by a TLS center 1(1) and a TLS diameter 1(1), to an m-th TLS frequency region that is defined by a TLS center 1(m) and a TLS diameter 1(m). In various instances, the first TLS frequency region of the group of TLS frequency regions 1 can be a continuous interval of frequency values, the TLS center 1(1) can be measured in Hertz and can denote the middle and/or midpoint of such continuous interval of frequency values, and the TLS diameter 1(1) can be measured in Hertz and can denote half the width (e.g., half the difference between the highest value and the lowest value) of such continuous interval of frequency values. Similarly, in various cases, the m-th TLS frequency region of the group of TLS frequency regions 1 can be a continuous interval of frequency values, the TLS center 1(m) can be measured in Hertz and can denote the middle and/or midpoint of such continuous interval of frequency values, and the TLS diameter 1(m) can be measured in Hertz and can denote half the width of such continuous interval of frequency values. In any case, the group of TLS frequency regions 1 can be considered as intervals of frequency values which the qubit 1 should avoid, lest the qubit 1 experience degraded coherence.

Likewise, in various aspects, the group of TLS frequency regions n can correspond to the qubit n. In other words, the group of TLS frequency regions n can be obtained by performing qubit relaxation spectroscopy on the qubit n of the qubit lattice 104. In various aspects, the group of TLS frequency regions n can include m regions for any suitable positive integer m: a first TLS frequency region that is defined by a TLS center n(1) and a TLS diameter n(1), to an m-th TLS frequency region that is defined by a TLS center n(m) and a TLS diameter n(m). In various instances, the first TLS frequency region of the group of TLS frequency regions n can be a continuous interval of frequency values, the TLS center n(1) can be measured in Hertz and can denote the middle and/or midpoint of such continuous interval of frequency values, and the TLS diameter n(1) can be measured in Hertz and can denote half the width of such continuous interval of frequency values. Similarly, in various cases, the m-th TLS frequency region of the group of TLS frequency regions n can be a continuous interval of frequency values, the TLS center n(m) can be measured in Hertz and can denote the middle and/or midpoint of such continuous interval of frequency values, and the TLS diameter n(m) can be measured in Hertz and can denote half the width of such continuous interval of frequency values. In any case, the group of TLS frequency regions n can be considered as intervals of frequency values which the qubit n should avoid, lest the qubit n experience degraded coherence.

Although FIG. 5 depicts the group of TLS frequency regions 1 and the group of TLS frequency regions n as including the same number of frequency regions (e.g., m), this is a mere non-limiting example for ease of illustration. In various aspects, the TLS frequency region 1 can have the same and/or different number of frequency regions as the TLS frequency region n.

In some cases, the set of TLS frequency regions 402 can be represented in mathematical notation as follows: for $i \in V$, the TLS regions that are associated with the qubit i can be denoted as $R_i^{TLS} = \{I_1, \ldots I_{k_i}\}$, where $k_i$ denotes the total number of TLS frequency regions (e.g., also called TLS frequency intervals) associated with the qubit i, and where $I_k = (c_k, d_k)$ denotes a k-th TLS frequency region associated with the qubit i, where k is any suitable positive integer that is less than or equal to $k_i$, where $c_k$ represents the center and/or midpoint of the TLS frequency region $I_k$, and where $d_k$ represents the diameter of the TLS frequency region $I_k$. In other words, $I_k = (c_k, d_k)$ can correspond to a range $[c_k - d_k, c_k + d_k]$; that is, $d_k$ can represent half the width of $I_k$.

Figure 6:
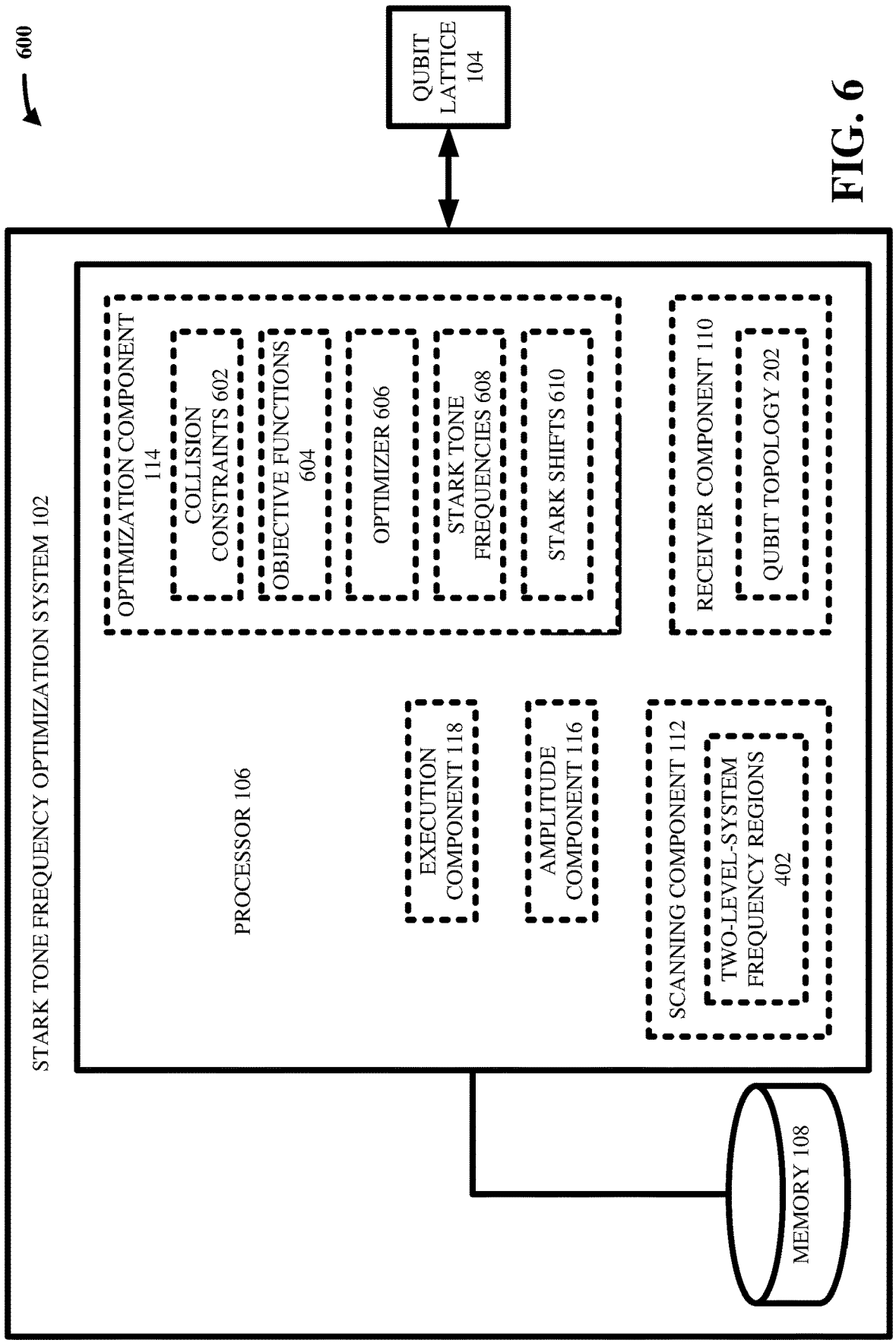
FIG. 6 illustrates a block diagram of an example, non-limiting system including a set of collision constraints, a set of objective functions, an optimizer, a set of Stark tone frequencies, and a set of Stark shifts that facilitates TLS-based optimization of Stark tone tuning in accordance with one or more embodiments described herein.

FIG. 6 illustrates a block diagram of an example, non-limiting system 600 including a set of collision constraints, a set of objective functions, an optimizer, a set of Stark tone frequencies, and a set of Stark shifts that can facilitate TLS-based optimization of Stark tone tuning in accordance with one or more embodiments described herein. As shown, the system 600 can, in some cases, comprise the same components as the system 400, and can further comprise a set of collision constraints 602, a set of objective functions 604, an optimizer 606, a set of Stark tone frequencies 608, and/or a set of Stark shifts 610.

In various embodiments, the optimization component 114 can electronically define the set of collision constraints 602 and the set of objective functions 604, based on the set of TLS frequency regions 402 and/or based on the qubit topology 202. Then, the optimization component 114 can electronically execute the optimizer 606, which can optimize (e.g., maximize and/or minimize) the set of objective functions 604 while satisfying the set of collision constraints 602. In other words, the optimizer 606 can identify which Stark tone frequencies and which Stark tone shifts should be applied to which qubits of the qubit lattice 104, so that optimal values of the set of objective functions 604 are obtained by the qubit lattice 104, and so that the qubit lattice 104 violates none of the set of collision constraints 602. This is further discussed with respect to FIGS. 7-8 and with respect to the mathematical notation introduced below.

In various aspects, the optimizer 606 can be any suitable computer software solver that is able to compute and/or identify optimal (e.g., maximal and/or minimal) solutions for given objective functions when given various constraints. As a non-limiting example, the optimizer 606 can be CPLEX. However, those having ordinary skill in the art will appreciate that any other suitable optimization software package (e.g., whether linear and/or non-linear) can be implemented as desired.

In various aspects, the optimizer 606 can operate according to the notation and/or decision variables denoted below.

Let $s_i$ represent the shift in the $f_{01}$ transition frequency of the qubit i, for any $i \in V$. Furthermore, let $f'_{i,X}$ represent the new and/or shifted transition frequency of the qubit i after a Stark tone has been applied to the qubit i, where $X \in \{01, 02, 02/2, 12\}$. In various aspects, the shifted transition frequencies can be assumed to vary linearly as follows:

$$f'_{i,01} = f_{i,01} + s_i$$

$$f'_{i,12} = f_{i,12} + \gamma_{i,12} s_i$$

$$f'_{i,02} = f_{i,02} + \gamma_{i,02} s_i$$

$$f'_{i,02/2} = f_{i,02} + \gamma_{i,02/2} s_i$$

where $\gamma_{i,X}$ can be considered as shift coefficients. In various cases, the shift coefficients $\gamma_{i,X}$ for each qubit i can be experimentally identified. For example, for each qubit i, different values of $s_i$ can be swept, the shifted and/or resulting transition frequencies $f'_{i,X}$ of the qubit i can be probed and/or measured, and regression analysis can be applied to estimate $\gamma_{i,X}$ (e.g., $\gamma_{i,12}$ can be considered as the slope of the resulting graph when $f'_{i,12}$ is plotted against $s_i$; $\gamma_{i,02}$ can be considered as the slope of the resulting graph when $f'_{i,02}$ is plotted against $s_i$; and $\gamma_{i,02/2}$ can be considered as the slope of the resulting graph when $f'_{i,02/2}$ is plotted against $s_i$). In some cases, estimation of $\gamma_{i,X}$ can be simplified by leveraging the following formulas:

$$\gamma_{i,02} = 1 + \gamma_{i,12}$$

$$\gamma_{i,02/2} = (1 + \gamma_{i,12})/2$$

In such case, $\gamma_{i,12}$ can be estimated by sweeping $s_i$ and probing $f'_{i,12}$, and $\gamma_{i,02}$ and $\gamma_{i,02/2}$ can be computed directly by the above formulas.

In various aspects, the optimizer 606 can operate on the directed graph $G' = (V, E')$ as mentioned above using the following variables. For each $i \in V$, there can be a Boolean variable $t_i \in \{0,1\}$ that denotes whether the qubit i is shifted or not. For example, if $t_i=0$, this can indicate that the qubit i is not driven by a Stark tone (e.g., qubit i is not shifted and/or tuned). On the other hand, if $t_i=1$, this can indicate that the qubit i is driven by a Stark tone (e.g., qubit i is shifted and/or tuned).

For each $i \in V$, there can be a continuous variable $s_i \in \mathbb{R}$ that denotes an amount of shift (e.g., measured in Hertz) experienced by the $f_{01}$ transition frequency of the qubit i (e.g., $f'_{i,01} = f_{i,01} + s_i$). Note that, if $t_i=0$, then $s_i=0$ (e.g., if the qubit i is not driven by a Stark tone, then the $f_{01}$ transition frequency of the qubit i can be unshifted and/or unchanged). In contrast, if $t_i=1$, then $s_i \neq 0$ (e.g., if the qubit i is driven by a Stark tone, then the $f_{01}$ transition frequency of the qubit i can be shifted and/or changed).

For each $(i, j) \in E'$, there can be a Boolean variable $r_{i,j} \in \{0,1\}$ that denotes which of the qubit i and the qubit j is the control qubit and that denotes which of the qubit i and the qubit j is the target qubit. In various instances, it can be desirable for the control qubit to have a higher $f_{01}$ transition frequency than the target qubit. After all, when a control qubit has a higher $f_{01}$ transition frequency than a target qubit, an entangling gate (e.g., CNOT gate) that is applied so as to entangle the control qubit with the target qubit can operate and/or be performed more quickly. In contrast, when a control qubit has a lower $f_{01}$ transition frequency than a target qubit, an entangling gate that is applied so as to entangle the control qubit with the target qubit can operate and/or be performed less quickly. In various aspects, $r_{i,j}=0$ can indicate that the qubit i is the control qubit and that the qubit j is the target qubit. In contrast, $r_{i,j}=1$ can indicate that the qubit i is the target qubit and that the qubit j is the control qubit. Since $(i, j) \in E'$ implies that the $f_{01}$ transition frequency of the qubit i is higher than that of the qubit j, then $r_{i,j}=0$ can be considered as indicating a default entangling direction (e.g., where the $f_{01}$ transition frequency of the control qubit is higher than that of the target qubit). On the other hand, since $(i, j) \in E'$ implies that the $f_{01}$ transition frequency of the qubit i is higher than that of the qubit j, then $r_{i,j}=1$ can be considered as indicating a flipped (e.g., not default) entangling gate direction (e.g., where the $f_{01}$ transition frequency of the control qubit is lower than that of the target qubit).

For each $i \in V$, there can be a continuous variable $u_i \in \mathbb{R}$ that denotes the frequency of the Stark tone that is applied to the qubit i. Note that, if $t_i=0$, then $u_i=0$. On the other hand, if $t_i=1$, then $u_i \neq 0$.

Finally, there can be a continuous variable $\varepsilon \in \mathbb{R}$ that denotes a smallest collision margin that is implemented in the qubit lattice 104. In various aspects, a collision margin can be equal to $\|f'_{i,X} - f'_{j,X}\|$ for any $(i, j) \in E$ (e.g., can be equal to the distance between the transition frequencies of two neighboring qubits). In various instances, a collision margin can be equal to $\|f'_{i,X} - (c_k + d_k)\|$ for any positive integer $k \leq k_i$ (e.g., can be equal to the distance between a transition frequency of a qubit and an upper bound of a TLS frequency region of the qubit). In various cases, a collision margin can be equal to $\|f'_{i,X} - (c_k - d_k)\|$ for any positive integer $k \leq k_i$ (e.g., can be equal to the distance between a transition frequency of a qubit and a lower bound of a TLS frequency region of the qubit). In various aspects, a collision margin can be equal to $\|f'_{i,X} - u_i\|$ (e.g., can be equal to the distance between a transition frequency of a qubit and the frequency of a Stark tone that is applied to the qubit). In various instances, a collision margin can be equal to $\|f'_{i,X} - u_j\|$ for any $(i,j) \in E$ (e.g., can be equal to the distance between a transition frequency of a qubit and the frequency of a Stark tone that is applied to a neighboring qubit). In various cases, a collision margin can be equal to $\|i_t - (c_k + d_k)\|$ for any positive integer $k \leq k_i$ (e.g., can be equal to the distance between the frequency of a Stark tone that is applied to a qubit and an upper bound of a TLS frequency region of the qubit). In various aspects, a collision margin can be equal to $\|i_t - (c_k - d_k)\|$ for any positive integer $k \leq k_i$ (e.g., can be equal to the distance between the frequency of a Stark tone that is applied to a qubit and a lower bound of a TLS frequency region of the qubit). In any case, the continuous variable $\varepsilon \in \mathbb{R}$ can be defined as the smallest of such collision boundaries. In alternative embodiments, the continuous variable $\varepsilon \in \mathbb{R}$ can be set to any suitable desired value.

These decision variables are non-limiting examples. In various aspects, those having ordinary skill in the art will appreciate that any other suitable decision variables can be implemented as desired.

Figure 7:
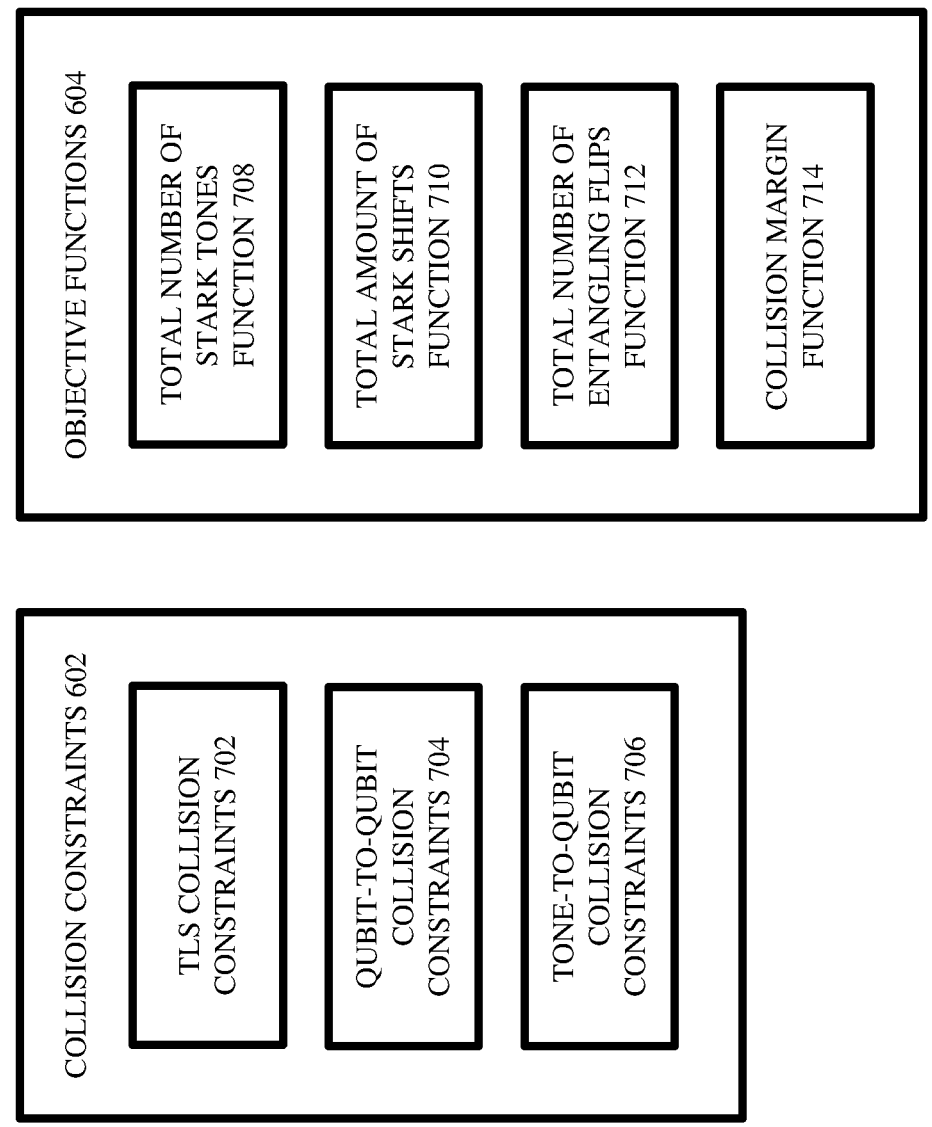
FIG. 7 illustrates example, non-limiting block diagrams of a set of collision constraints and a set of objective functions in accordance with one or more embodiments described herein.

FIG. 7 illustrates example, non-limiting block diagrams 700 of a set of collision constraints and a set of objective functions in accordance with one or more embodiments described herein. In other words, FIG. 7 depicts non-limiting example embodiments of the set of collision constraints 602 and the set of objective functions 604.

In various aspects, as shown, the set of collision constraints 602 can include a set of TLS collision constraints 702, a set of qubit-to-qubit collision constraints 704, and/or a set of tone-to-qubit collision constraints 706.

In various instances, the set of TLS collision constraints 702 can include any suitable mathematical equations and/or inequalities which, when satisfied by a Stark tone tuning regime, ensure that the Stark tone tuning regime eliminates and/or prevents TLS frequency collisions of the qubit lattice 104. For instance, the set of TLS collision constraints 702 can include any suitable equations and/or inequalities which, when satisfied by a Stark tone tuning regime, ensure that the Stark tone tuning regime does not shift the transition frequencies of any qubit into a TLS frequency region of the qubit. A non-limiting example of such an equation and/or inequality can be as follows:

$$\|f'_{i,X} - c_k\| \geq d_k + \varepsilon$$

for $i \in V$, for $X \in \{01, 02, 02/2, 12\}$, and for $(c_k, d_k) \in R_i^{TLS}$.

In various cases, the set of TLS collision constraints 702 can also include any suitable equations and/or inequalities which, when satisfied by a Stark tone tuning regime, ensure that the Stark tone tuning regime does not shift the $f_{01}$ transition frequency of any target qubit into a TLS frequency region of a control qubit corresponding to the target qubit. A non-limiting example of such an equation and/or inequality can be as follows:

$$\|f'_{j,01} - c_k\| \geq d_k + \varepsilon$$

for $(i,j) \in E'$, for $(c_k, d_k) \in R_i^{TLS}$, and for $r_{i,j}=0$ (e.g., not flipped entanglement direction). Another non-limiting example of such an equation and/or inequality can be as follows:

$$\|f'_{i,01} - c_k\| \geq d_k + \varepsilon$$

for $(i,j) \in E'$, for $(c_k, d_k) \in R_j^{TLS}$, and for $r_{i,j}=1$ (e.g., flipped entanglement direction).

In various aspects, the set of qubit-to-qubit collision constraints 704 can include any suitable mathematical equations and/or inequalities which, when satisfied by a Stark tone tuning regime, ensure that the Stark tone tuning regime eliminates and/or prevents direct frequency collisions between neighboring qubits. In other words, the set of qubit-to-qubit collision constraints 704 can include any suitable mathematical equations and/or inequalities which, when satisfied by a Stark tone tuning regime, ensure that the Stark tone tuning regime does not shift the transition frequencies of any neighboring qubits to be too close together. Various non-limiting examples of such equations and/or inequalities are as follows, where "MHz" denotes "megaHertz":

$$\|f_{i,01} - f_{j,01}\| \geq \text{MHz} + \varepsilon$$

for $(i,j) \in E'$;

$$\|f_{i,02} - 2f_{j,01}\| \geq 8 \text{ MHz} + \varepsilon$$

for $(i,j) \in E$, and for $r_{i,j} = 0$;

$$\|f_{j,02} - 2f_{i,01}\| \geq 8 \text{ MHz} + \varepsilon$$

for $(i,j) \in E$, and for $r_{i,j} = 1$;

$$\|f_{i,01} - 2f_{j,12}\| \geq 30 \text{ MHz} + \varepsilon$$

for $(i,j) \in E'$;

$$f_{j,01} - f_{i,12} \geq \varepsilon$$

for $(i,j) \in E$, and for $r_{i,j} = 0$;

$$f_{i,01} - f_{j,01} \geq \varepsilon$$

for $(i,j) \in E$, and for $r_{i,j} = 0$;

$$f_{i,01} - f_{j,12} \geq \varepsilon$$

for $(i,j) \in E$, and for $r_{i,j} = 1$;

$$f_{j,01} - f_{i,01} \geq \varepsilon$$

for $(i,j) \in E$, and for $r_{i,j} = 1$;

$$\|f_{q,01} - f_{j,01}\| \geq 17 \text{ MHz} + \varepsilon$$

for $(i,q) \in E$, for $j \in N(i) - \{q\}$, and for $r_{i,q} = 0$;

$$\|f_{i,01} - f_{j,01}\| \geq 17 \text{ MHz} + \varepsilon$$

for $(i,q) \in E$, for $j \in N(i) - \{i\}$, and for $r_{i,q} = 1$;

$$\|f_{q,01} - f_{j,12}\| \geq 25 \text{ MHz} + \varepsilon$$

for $(i,q) \in E$, for $j \in N(i) - \{q\}$, and for $r_{i,q} = 0$;

$$\|f_{q,01} - f_{j,12}\| \geq 17 \text{ MHz} + \varepsilon$$

for $(i,q) \in E$, for $j \in N(q) - \{i\}$, and for $r_{i,q} = 1$;

$$\|f_{q,12} - f_{j,01}\| \geq 25 \text{ MHz} + \varepsilon$$

for $(i,q) \in E$, for $j \in N(i) - \{q\}$, and for $r_{i,q} = 0$;

$$\|f_{q,12} - f_{j,01}\| \geq 17 \text{ MHz} + \varepsilon$$

for $(i,q) \in E$, for $j \in N(q) - \{i\}$, and for $r_{i,q} = 1$;

$$\|f_{i,01} - f_{q,01} - f_{j,01}\| \geq 17 \text{ MHz} + \varepsilon$$

for $(i,q) \in E$, for $j \in N(i) - \{q\}$, and for $r_{i,q} = 0$;

$$\|f_{q,01} - f_{i,01} - f_{j,01}\| \geq 17 \text{ MHz} + \varepsilon$$

for $(i,q) \in E$, for $j \in N(q) - \{i\}$, and for $r_{i,q} = 1$; and/or $$f_{i,01} + \varepsilon \geq f_{j,01}$$

for $(i,j) \in E'$.

In various aspects, the set of tone-to-qubit collision constraints 706 can include any suitable mathematical equations and/or inequalities which, when satisfied by a Stark tone tuning regime, ensure that the Stark tone tuning regime eliminates and/or prevents frequency collisions between the frequencies of Stark tones and either transition frequencies of qubits and/or TLS frequency regions of qubits. Various non-limiting examples of such equations and/or inequalities are as follows:

$$\|u_i - f_{i,01}\| \leq 17 \text{ MHz} + \varepsilon$$

for $i \in V$, and for $t_i = 1$;

$$\|u_i - f_{i,01}\| \geq 50 \text{ MHz} + \varepsilon$$

for $i \in V$, and for $t_i = 1$;

$$\|u_i - f_{i,X}\| \geq 10 \text{ MHz} + \varepsilon$$

for $i \in V$, for $X \in \{01, 02, 02/2, 12\}$, and for $t_i = 1$;

$$\|u_i - f_{j,X}\| \geq 10 \text{ MHz} + \varepsilon$$

for $j \in N(i)$, for $X \in \{01, 02, 02/2, 12\}$, and for $t_i = 1$; and/or $$\|u_i - c_k\| \geq d_k + \varepsilon$$

for $i \in V$, for $(c_k, d_k) \in R_i^{TLS}$, and for $t_i = 1$.

Note that the above constraints are mere non-limiting examples. Those having ordinary skill in the art will appreciate that different and/or additional constraints can be incorporated as desired. Those having ordinary skill in the art will further appreciate that any numerical values listed in the above constraints are mere non-limiting examples. In various aspects, different numerical values can be implemented (e.g., the invention is not limited to the above recitations of 32 MHz, 8 MHz, 30 MHz, 17 MHz, 25 MHz, 200 MHz, 50 MHz, and/or 10 MHz).

In various aspects, as shown, the set of objective functions 604 can include a total number of Stark tones function 708, a total amount of Stark shifts function 710, a total number of entangling flips function 712, and/or a collision margin function 714.

A non-limiting example of the total number of Stark tones function 708 can be as follows:

$$\sum_{i \in V} t_i$$

which can be considered as a function that counts the number of Stark tones (e.g., which counts the number of qubits to which a Stark tone is applied).

A non-limiting example of the total amount of Stark shifts function 710 can be as follows:

$$\sum_{i \in V} \|S_i\|$$

which can be considered as linearly adding together the absolute values of all of the Stark shifts caused by all of the Stark tones.

Another non-limiting example of the total amount of Stark shifts function 710 can be as follows:

$$\sum_{i \in V} (S_i)^2$$

which can be considered as adding together the squares of all of the Stark shifts.

A non-limiting example of the total number of entangling flips function 712 can be as follows:

$$\sum_{(i,j) \in E'} r_{i,j}$$

which can be considered as counting how many entangling directions are flipped by all of the Stark tones.

In various aspects, the collision margin function 714 can be equal to E (e.g., can be equal to the smallest collision boundary and/or collision margin that is facilitated by all of the Stark tones).

In various embodiments, the optimization component 114 can electronically execute the optimizer 606 on the set of objective functions 604 and on the set of collision constraints 602. In various aspects, this can cause the optimizer 606 to produce as output the set of Stark tone frequencies 608 and the set of Stark shifts 610. More specifically, the optimizer 606 can iterate through any suitable combinations and/or permutations of values for the decision variables $t_i$, $s_i$, $r_{i,j}$, $u_i$, and $\varepsilon$ for all $i \in V$, until a combination and/or permutation of values of the decision variables is identified which minimizes the total number of Stark tones function 708, minimizes the total amount of Stark shifts function 710, minimizes the total number of entangling flips function 712, and/or maximizes the collision margin function 714, while simultaneously satisfying all of the set of collision constraints 602. Accordingly, the optimized values for $u_i$ for all $i \in V$ can be considered as the set of Stark tone frequencies 608, and the optimized values for $s_i$ for all $i \in V$ can be considered as the set of Stark shifts 610. That is, the optimizer 606 can identify and/or determine by how much each qubit of the qubit lattice 104 should be tuned with a Stark tone (e.g., represented by the identified $s_i$ for all $i \in V$), and the optimizer 606 can identify and/or determine the frequencies of each of such Stark tones (e.g., represented by the identified $u_i$ for all $i \in V$). This is shown more in FIG. 8.

Figure 8:
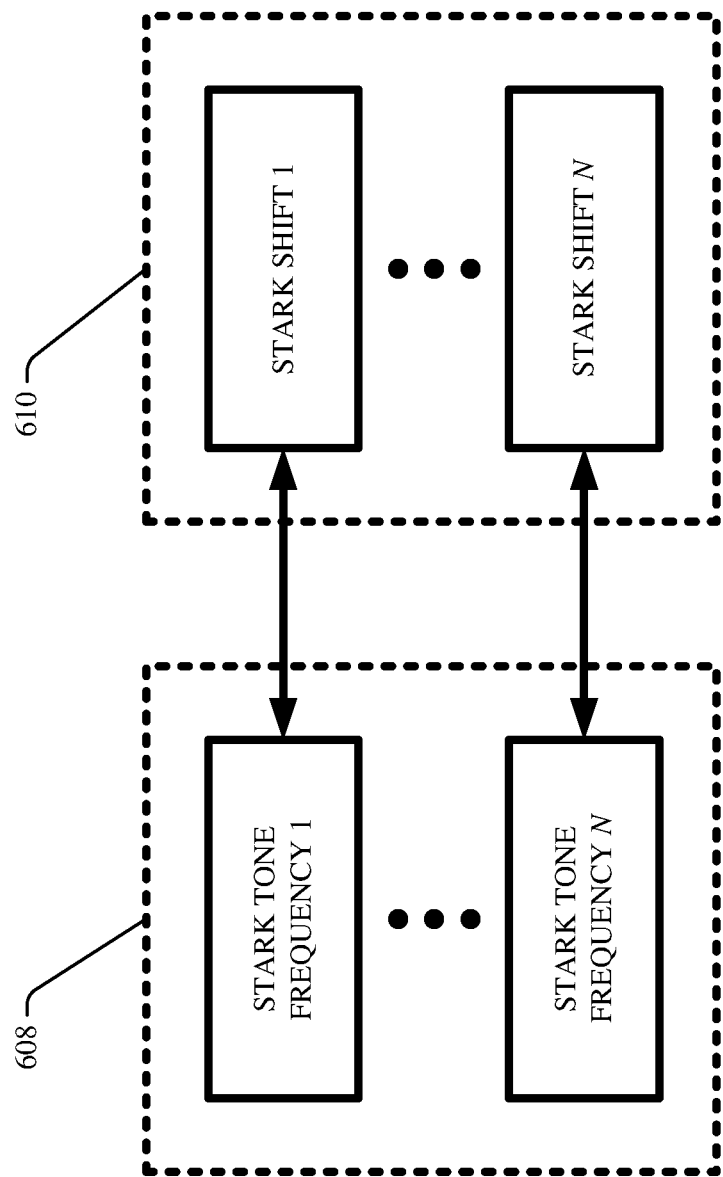
FIG. 8 illustrates example, non-limiting block diagrams of a set of Stark tone frequencies and a set of Stark shifts in accordance with one or more embodiments described herein.

FIG. 8 illustrates example, non-limiting block diagrams 800 of a set of Stark tone frequencies and a set of Stark shifts in accordance with one or more embodiments described herein. In other words, FIG. 8 depicts non-limiting example embodiments of the set of Stark tone frequencies 608 and the set of Stark shifts 610.

As shown, the set of Stark tone frequencies 608 can include n frequency values: a Stark tone frequency 1 to a Stark tone frequency n. Likewise, the set of Stark shifts 610 can include n shift values: a Stark shift 1 to a Stark shift n. In various aspects, the set of Stark tone frequencies 608 and the set of Stark shifts 610 can respectively correspond to each other and can each respectively correspond to the set of qubits 302. For example, the Stark tone frequency 1 can be considered as the frequency of the Stark tone that the optimizer 606 has determined should be applied to the qubit 1 of the qubit lattice 104. In other words, the Stark tone frequency 1 can be considered as the value of $u_i$ that satisfies the set of collision constraints 602 and optimizes the set of objective functions 604. Moreover, the Stark shift 1 can be considered as the resulting shift in $f_{01}$ transition frequency of the qubit 1 due to application of the Stark tone that the optimizer 606 has determined should be applied to the qubit 1. That is, the Stark shift 1 can be considered as the value of $s_i$ that satisfies the set of collision constraints 602 and optimizes the set of objective functions 604.

As another example, the Stark tone frequency n can be considered as the frequency of the Stark tone that the optimizer 606 has determined should be applied to the qubit n of the qubit lattice 104. In other words, the Stark tone frequency n can be considered as the value of $u_n$ that satisfies the set of collision constraints 602 and optimizes the set of objective functions 604. Moreover, the Stark shift n can be considered as the resulting shift in $f_{01}$ transition frequency of the qubit n due to application of the Stark tone that the optimizer 606 has determined should be applied to the qubit n. That is, the Stark shift n can be considered as the value of $s_n$ that satisfies the set of collision constraints 602 and optimizes the set of objective functions 604.

In various aspects, those having ordinary skill in the art will appreciate that the optimizer 606 can sequentially optimize (e.g., maximize and/or minimize) the set of objective functions 604 in any suitable order as desired. For example, the optimizer 606 can minimize the total amount of Stark shifts function 710, then can minimize the total number of Stark tones function 708, then can maximize the collision margin function 714, and finally can minimize the total number of entangling flips function 712. In other cases, however, any other suitable order of optimization can be implemented as desired.

In some cases, as those having ordinary skill in the art will appreciate, any of the set of objective functions 604 can be fixed as desired. For example, the total number of Stark tones function 708 can be set to any suitable fixed value, so that minimization of the total number of Stark tones function 708 need not be performed by the optimizer 606. As another example, the collision margin function 714 can be set to any suitable fixed value, so that maximization of the collision margin function 714 need not be performed by the optimizer 606.

As those having ordinary skill in the art will appreciate, the optimizer 606 can compute a globally optimized solution for the set of objective functions 604 given the set of collision constraints 602, provided that sufficient computation time is available. If only a limited amount of computation time is available, those having ordinary skill in the art will appreciate that the optimizer 606 can compute a non-globally optimized solution that is considered as the best available solution given such limited computation time.

Figure 9:
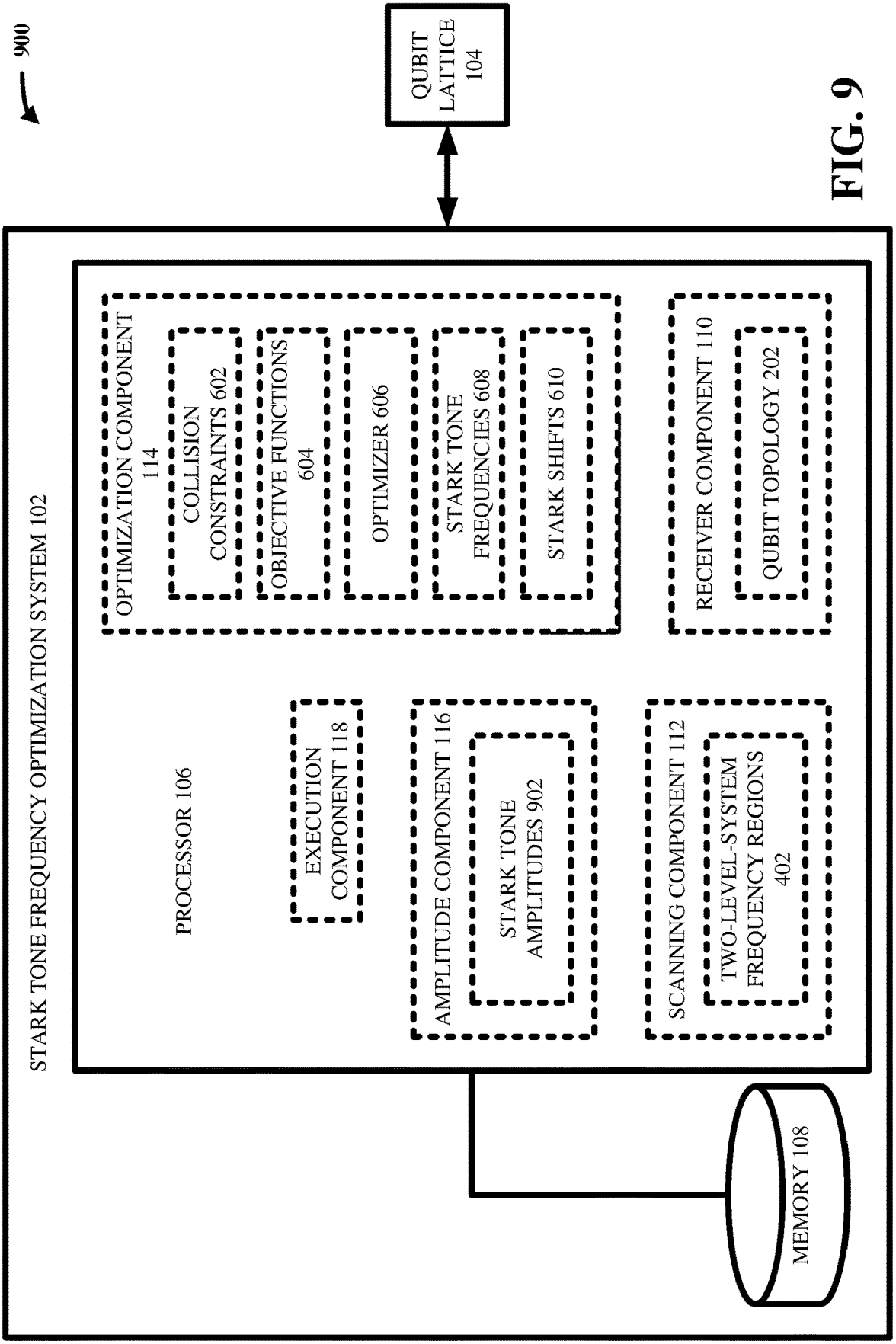
FIG. 9 illustrates a block diagram of an example, non-limiting system including a set of Stark tone amplitudes that facilitates TLS-based optimization of Stark tone tuning in accordance with one or more embodiments described herein.

FIG. 9 illustrates a block diagram of an example, non-limiting system 900 including a set of Stark tone amplitudes that can facilitate TLS-based optimization of Stark tone tuning in accordance with one or more embodiments described herein. As shown, the system 900 can, in some cases, comprise the same components as the system 600, and can further comprise a set of Stark tone amplitudes 902.

In various embodiments, the amplitude component 116 can electronically compute the set of Stark tone amplitudes 902, based on the set of Stark tone frequencies 608 and based on the set of Stark shifts 610. As mentioned above, the optimizer 606 can identify the set of Stark tone frequencies 608 and the set of Stark shifts 610, which can be considered as Stark tone tuning parameters that can minimize and/or eliminate frequency collisions (e.g., including TLS frequency collisions) within the qubit lattice 104. However, in various aspects, a Stark tone can be considered as having three interrelated parameters: a frequency value, an amplitude value, and a resulting shift value. Thus, when given any two of such three interrelated parameters, the third can be computed analytically (and/or experimentally as desired). As a non-limiting example, the following formula can be used to compute a Stark tone amplitude when given a Stark tone frequency and a Stark shift that are applied to a qubit i:

$$s_i = \frac{\alpha_i(\Omega_i)^2}{2\Delta_i(\alpha_i + \Delta_i)}$$

where $s_i$ denotes the Stark shift in transition frequency of the qubit i that is caused by the Stark tone, where $\alpha_i$ denotes the anharmonicity of the qubit i, where $\Delta_i = u_i - f_{i,01}$ denotes the detuning between the qubit i and the Stark tone frequency $u_i$, and where $\Omega_i$ denotes the Stark tone amplitude that is applied to the qubit i. In other words, when a Stark tone having a frequency of $u_i$ and an amplitude of $\Omega_i$ is applied to the qubit i, the Stark tone can cause the $f_{01}$ transition frequency of the qubit i to shift by $s_i$. In this way, the amplitude component 116 can electronically calculate a Stark tone amplitude value for each frequency-shift pair given by the set of Stark tone frequencies 608 and the set of Stark shifts 610, thereby yielding the set of Stark tone amplitudes 902. This is further shown in FIG. 10.

Figure 10:
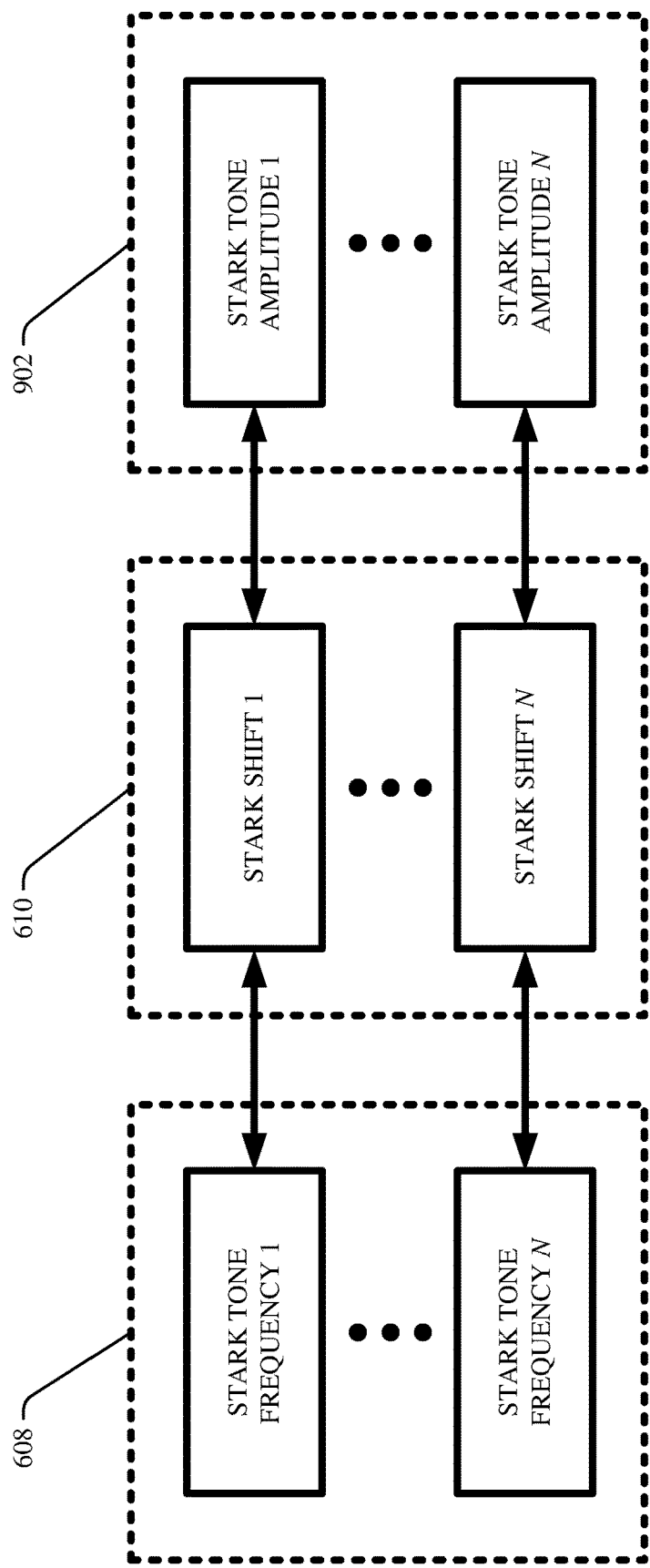
FIG. 10 illustrates an example, non-limiting block diagram of a set of Stark tone amplitudes in accordance with one or more embodiments described herein.

FIG. 10 illustrates an example, non-limiting block diagram 1000 of a set of Stark tone amplitudes in accordance with one or more embodiments described herein. In other words, FIG. 10 depicts a non-limiting example embodiment of the set of Stark tone amplitudes 902.

As shown, the set of Stark tone amplitudes 902 can include n amplitude values: a Stark tone amplitude 1 to a Stark tone amplitude n. Accordingly, the set of Stark tone amplitudes 902 can be considered as corresponding to the set of Stark tone frequencies 608, to the set of Stark shifts 610, and/or to the set of qubits 302. For example, the optimizer 606 can determine that a particular Stark tone should be applied to the qubit 1, and the frequency of such particular Stark tone can be equal to the Stark tone frequency 1 (e.g., $u_1$), the amplitude of such particular Stark tone can be equal to the Stark tone amplitude 1 (e.g., $\Omega_1$), and such particular Stark tone can cause the $f_{01}$ transition frequency of the qubit 1 to shift by an amount equal to the Stark shift 1 (e.g., can be a positive or negative shift). Furthermore, as mentioned above, the amplitude component 116 can calculate the Stark tone amplitude 1 based on both the Stark tone frequency 1 and the Stark shift 1. As another example, the optimizer 606 can determine that a different Stark tone should be applied to the qubit n, and the frequency of such different Stark tone can be equal to the Stark tone frequency n (e.g., $u_n$), the amplitude of such different Stark tone can be equal to the Stark tone amplitude n (e.g., $\Omega_n$), and such particular Stark tone can cause the $f_{01}$ transition frequency of the qubit n to shift by an amount equal to the Stark shift n (e.g., can be a positive or negative shift). Again, as mentioned above, the amplitude component 116 can calculate the Stark tone amplitude n based on both the Stark tone frequency n and the Stark shift n.

Figure 11:
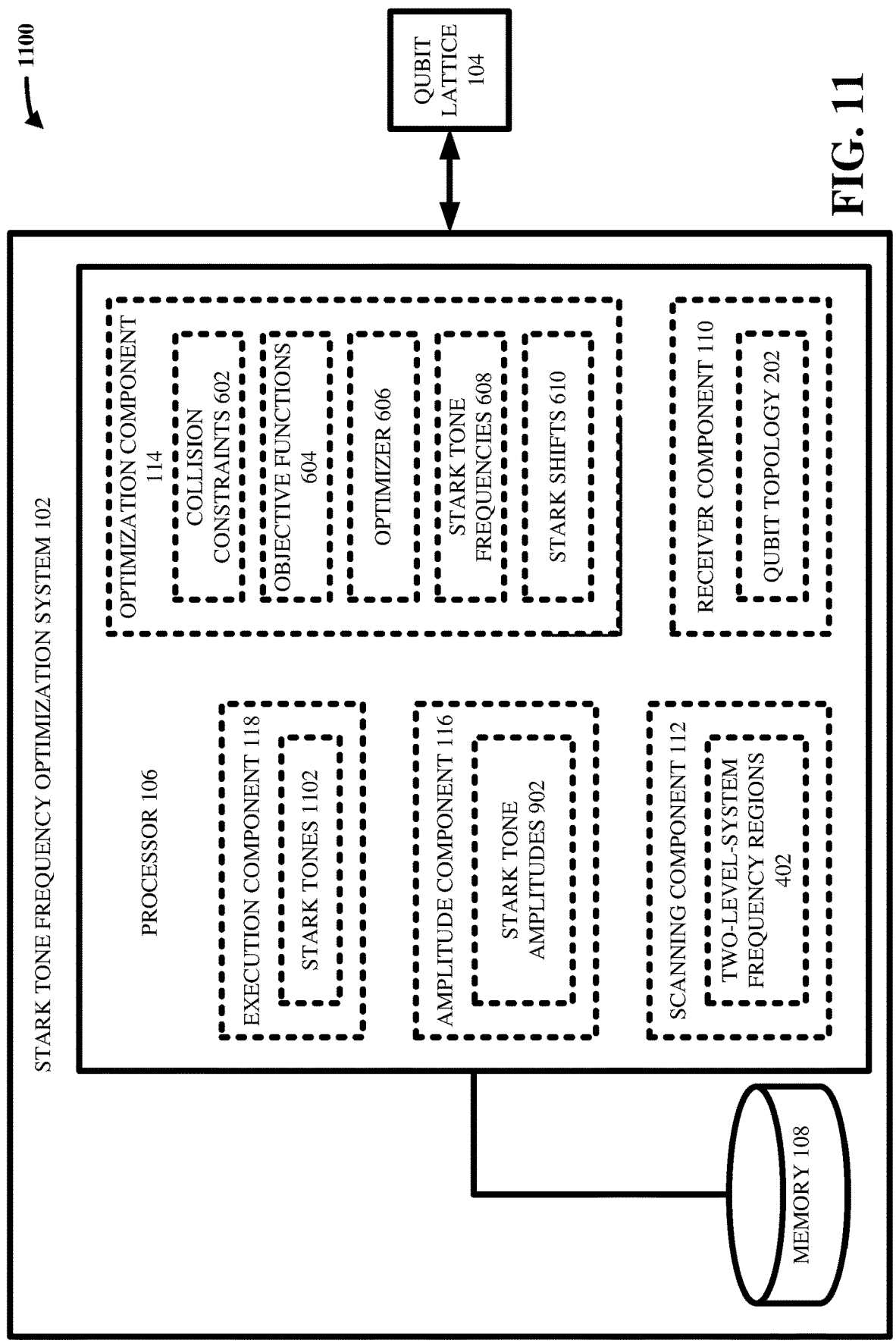
FIG. 11 illustrates a block diagram of an example, non-limiting system including a set of Stark tones that facilitates TLS-based optimization of Stark tone tuning in accordance with one or more embodiments described herein.

FIG. 11 illustrates a block diagram of an example, non-limiting system 1100 including a set of Stark tones that can facilitate TLS-based optimization of Stark tone tuning in accordance with one or more embodiments described herein. As shown, the system 1100 can, in some cases, comprise the same components as the system 900, and can further comprise a set of Stark tones 1102.

In various embodiments, the set of Stark tone frequencies 608, the set of Stark shifts 610, and the set of Stark tone amplitudes 902 can collectively define the set of Stark tones 1102, and the execution component 118 can electronically apply, via any suitable waveform generators (not shown), the set of Stark tones 1102 to the qubit lattice 104. In various cases, because the set of Stark tones 1102 can be considered as having been identified by the optimizer 606 to satisfy the set of collision constraints 602, application of the set of Stark tones 1102 to the qubit lattice 104 can prevent and/or eliminate frequency collisions, including TLS frequency collisions, in the qubit lattice 104.

Figure 12:
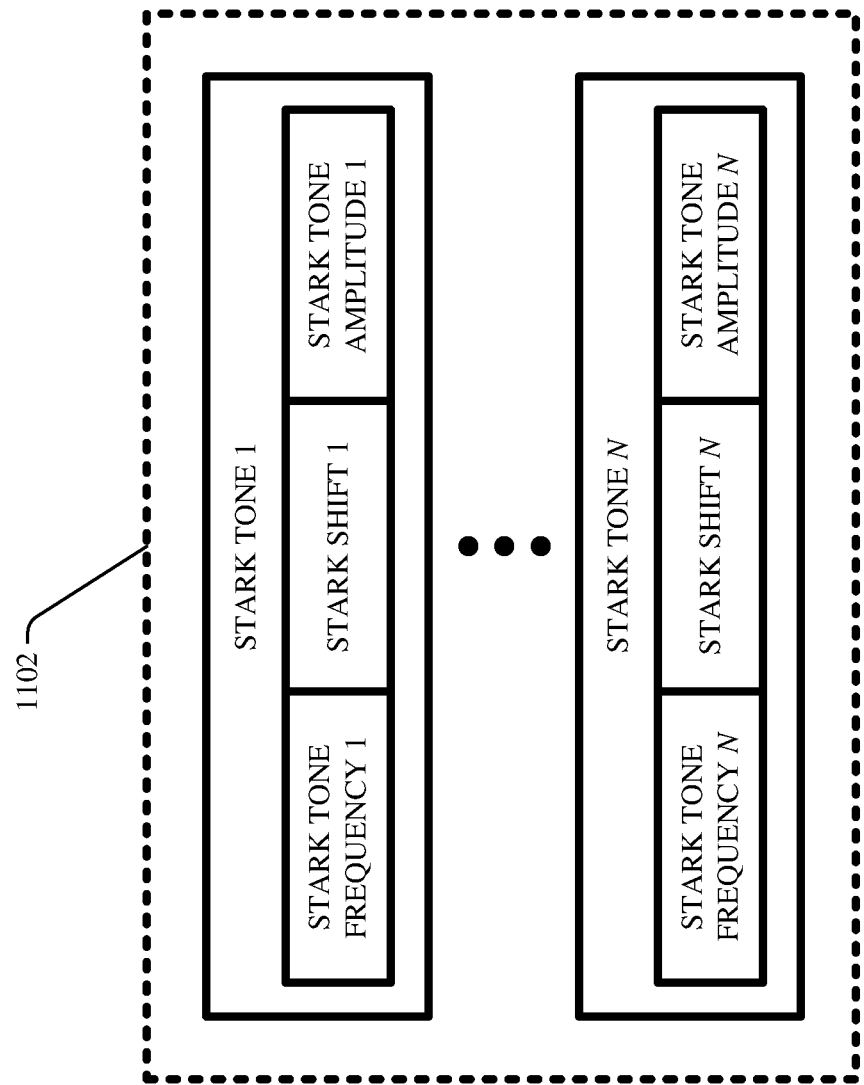
FIG. 12 illustrates an example, non-limiting block diagram of a set of Stark tones in accordance with one or more embodiments described herein.

FIG. 12 illustrates an example, non-limiting block diagram 1200 of the set of Stark tones 1102 in accordance with one or more embodiments described herein. As shown, the set of Stark tones 1102 can include n tones: a Stark tone 1 to a Stark tone n. In various aspects, as shown, the Stark tone 1 can be considered as having a frequency that is equal to the Stark tone frequency 1. In various instances, the Stark tone 1 can further be considered as having an amplitude that is equal to the Stark tone amplitude 1. Moreover, in various cases, the Stark tone 1 can, when applied to the qubit 1 of the qubit lattice 104, cause the $f_{01}$ transition frequency of the qubit 1 to change and/or shift by an amount equal to the Stark shift 1. Similarly, in various aspects, the Stark tone n can be considered as having a frequency that is equal to the Stark tone frequency n, can be considered as having an amplitude that is equal to the Stark tone amplitude n, and can, when applied to the qubit n of the qubit lattice 104, cause the $f_{01}$ transition frequency of the qubit n to change and/or shift by an amount equal to the Stark shift n. Accordingly, the execution component 118 can electronically apply the set of Stark tones 1102 to the set of qubits 302 of the qubit lattice 104 (e.g., can apply Stark tone 1 to the qubit 1 and can apply the Stark tone n to the qubit n).

Note that, in various cases, the optimizer 606 can determine that fewer than all of the qubits in the qubit lattice 104 should be tuned via a Stark tone. In such cases, the corresponding Stark tone frequencies, Stark tone amplitudes, and/or Stark shifts for qubits that are not tuned by a Stark tone can be equal to 0. For example, if the optimizer 606 determines that the qubit 1 should not be tuned via a Stark tone (e.g., if $t_1=0$), then the Stark tone frequency 1 can be zero, the Stark tone amplitude 1 can be zero, and the Stark shift 1 can be zero.

Figure 13:
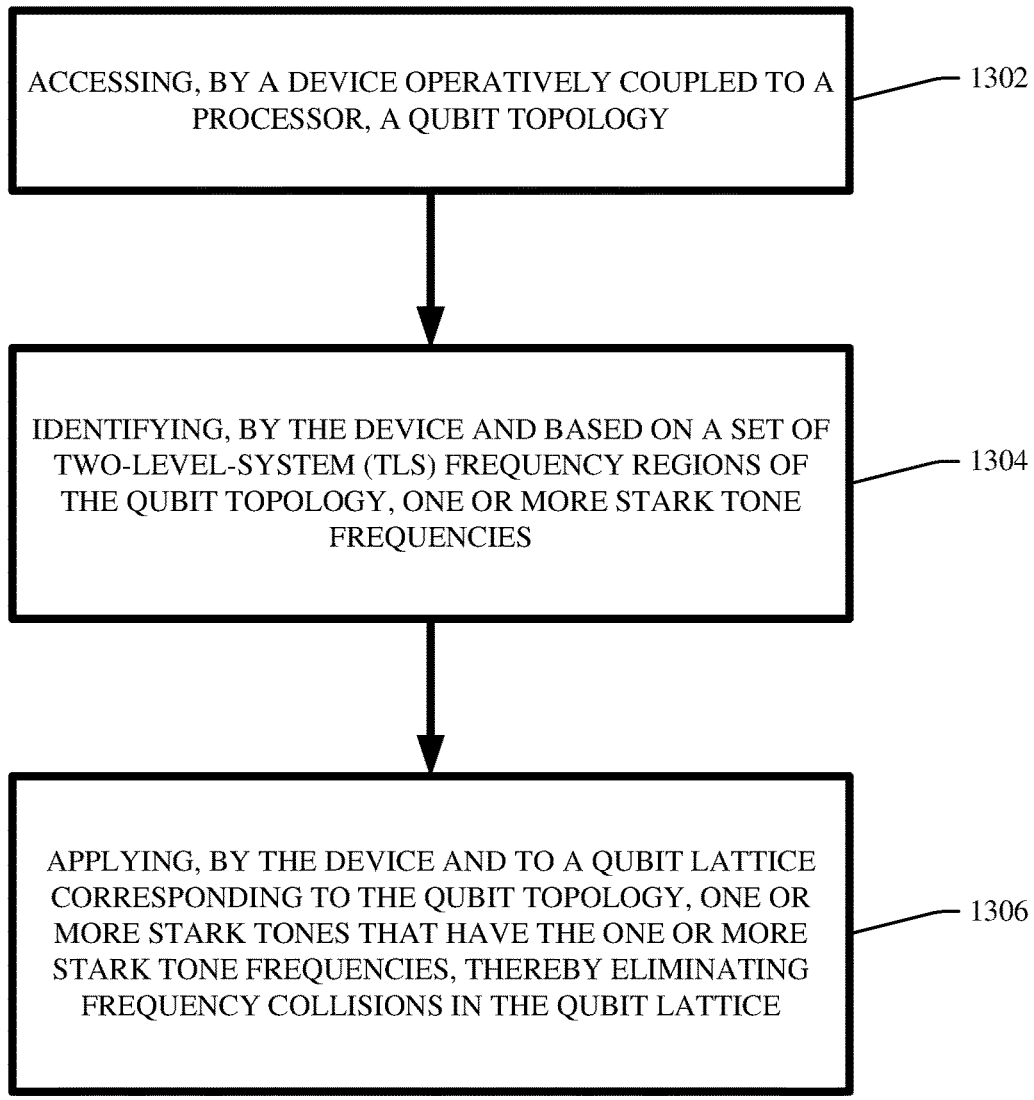
FIGS. 13-14 illustrate flow diagrams of example, non-limiting computer-implemented methods that facilitate TLS-based optimization of Stark tone tuning in accordance with one or more embodiments described herein.
Figure 14:
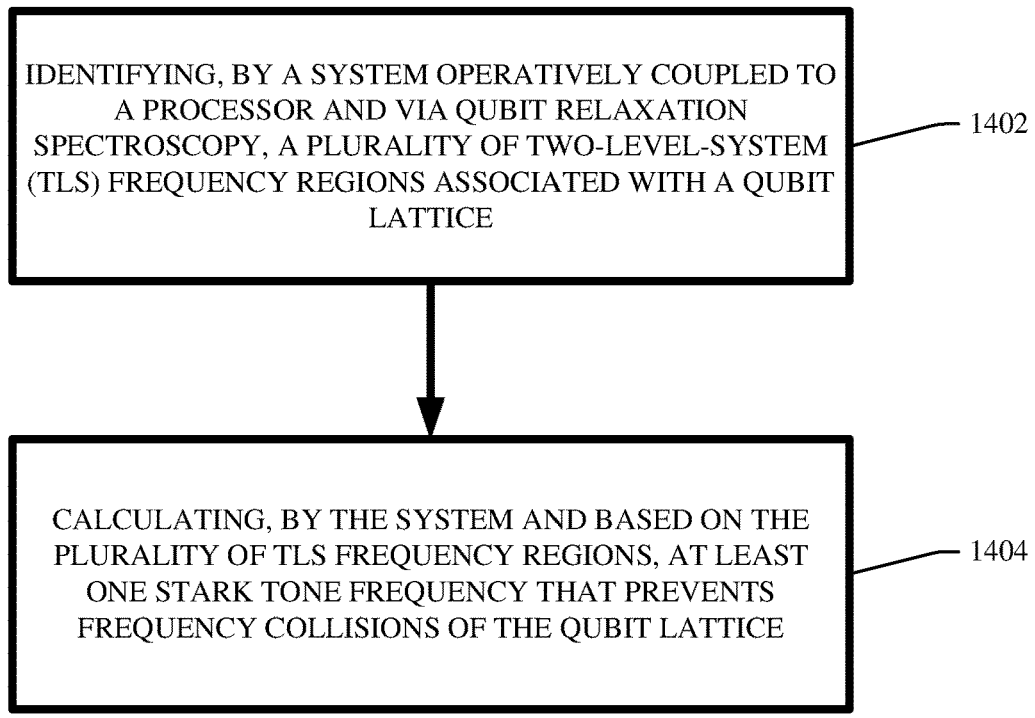

FIGS. 13-14 illustrate flow diagrams of example, non-limiting computer-implemented methods 1300 and 1400 that can facilitate TLS-based optimization of Stark tone tuning in accordance with one or more embodiments described herein. In various cases, the Stark tone frequency optimization system 102 can facilitate the computer-implemented method 1300 and/or the computer-implemented method 1400.

First, consider FIG. 13. In various embodiments, act 1302 can include accessing, by a device (e.g., via 110) operatively coupled to a processor, a qubit topology (e.g., 202).

In various aspects, act 1304 can include identifying, by the device (e.g., via 114) and based on a set of two-level-system (TLS) frequency regions (e.g., 402) of the qubit topology, one or more Stark tone frequencies (e.g., 608).

In various instances, act 1306 can include applying, by the device (e.g., via 118) and to a qubit lattice (e.g., 104) corresponding to the qubit topology, one or more Stark tones (e.g., 1102) that have the one or more Stark tone frequencies, thereby eliminating frequency collisions in the qubit lattice.

Although not explicitly shown in FIG. 13, the computer-implemented method 1300 can further include: identifying, by the device (e.g., via 112) and via application of qubit relaxation spectroscopy to a qubit lattice (e.g., 104) corresponding to the qubit topology, the set of TLS frequency regions.

Although not explicitly shown in FIG. 13, the device can identify the one or more Stark tone frequencies by executing an optimizer (e.g., 606) on a set of collision constraints (e.g., 602), wherein the set of collision constraints can include a set of TLS collision constraints (e.g., 702) that are based on the set of TLS frequency regions.

Although not explicitly shown in FIG. 13, the set of collision constraints can further include a set of qubit-to-qubit collision constraints (e.g., 704) and a set of tone-to-qubit collision constraints (e.g., 706).

Now, consider FIG. 14. In various embodiments, act 1402 can include identifying, by a system (e.g., via 112) operatively coupled to a processor and via qubit relaxation spectroscopy, a plurality of two-level-system (TLS) frequency regions (e.g., 402) associated with a qubit lattice (e.g., 104).

In various aspects, act 1404 can include calculating, by the system (e.g., via 114) and based on the plurality of TLS frequency regions, at least one Stark tone frequency (e.g., 608) that prevents frequency collisions of the qubit lattice.

Although not explicitly shown in FIG. 14, the at least one Stark tone frequency can correspond to at least one Stark shift (e.g., 610), and the computer-implemented method 1400 can further include: estimating, by the system (e.g., via 116), at least one Stark tone amplitude (e.g., 902) that, in combination with the at least one Stark tone frequency, causes the at least one Stark shift.

Although not explicitly shown in FIG. 14, the computer-implemented method 1400 can further include: applying, by the system (e.g., via 118), at least one Stark tone (e.g., 1102) to the qubit lattice, according to the at least one Stark tone frequency and the at least one Stark tone amplitude.

Although not explicitly shown in FIG. 14, the system can calculate the at least one Stark tone frequency and the at least one Stark shift via an optimization engine (e.g., 606) that operates according to a plurality of collision constraints (e.g., 602), wherein the plurality of collision constraints are based on the plurality of TLS frequency regions.

Although not explicitly shown in FIG. 14, the optimization engine can implement mixed integer linear programming or mixed integer quadratic programming.

Therefore, various embodiments described herein can be considered as a computerized tool can that identify which qubits of a qubit lattice should be tuned by which Stark tones, so as to eliminate and/or prevent frequency collision (specifically TLS frequency collisions) in the qubit lattice. Such a computerized tool is certainly and useful and practical application of computers.

Although the herein disclosure mainly describes various embodiments of the invention as applying to fixed-frequency qubits, this is a mere non-limiting example. Those having ordinary skill in the art will appreciate that the herein teachings can be extended and/or extrapolated to flux-tunable qubits as desired.

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

Figure 15:
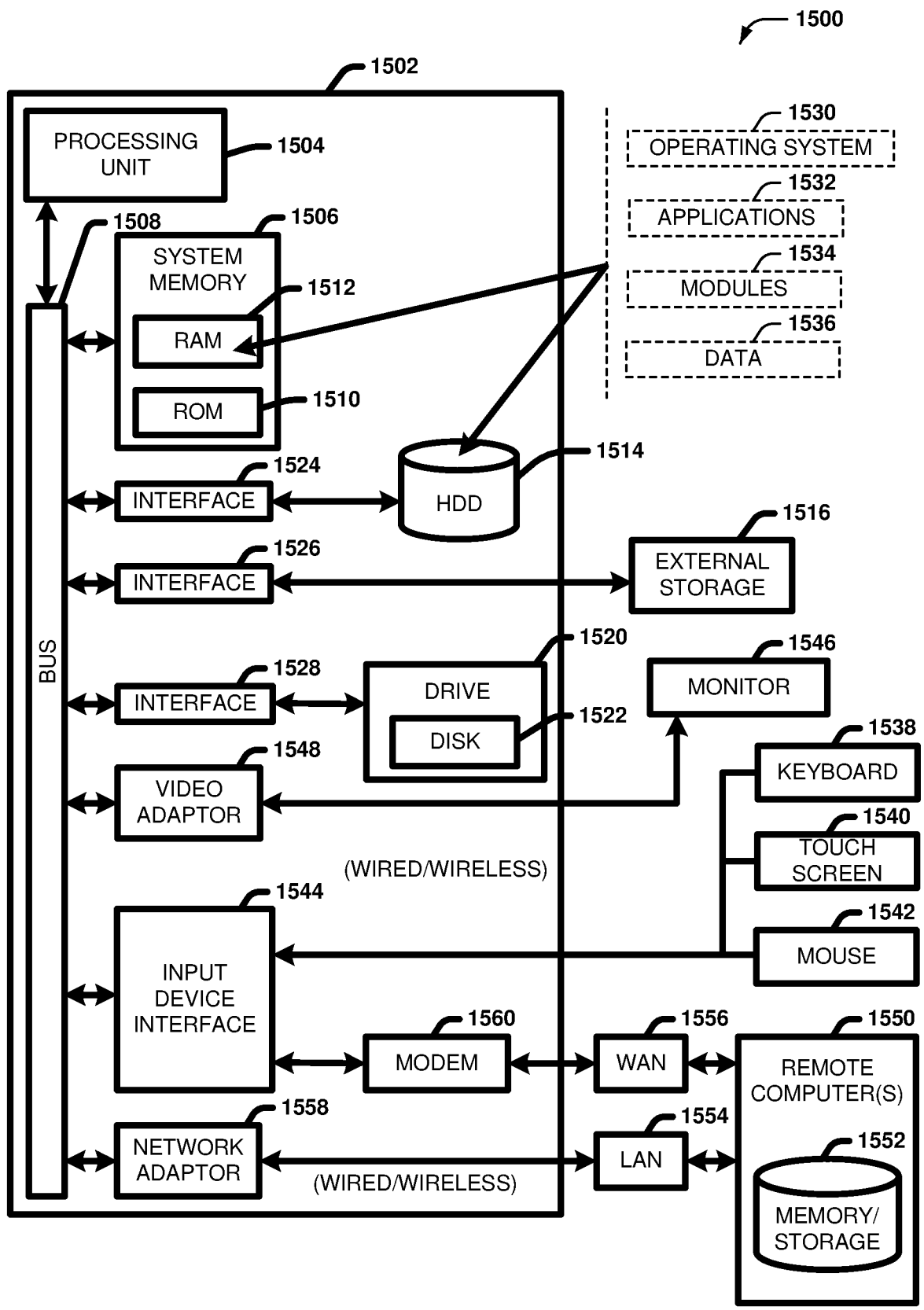
FIG. 15 illustrates a block diagram of an example, non-limiting operating environment in which one or more embodiments described herein can be facilitated.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and a drive 1520, e.g., such as a solid state drive, an optical disk drive, which can read or write from a disk 1522, such as a CD-ROM disc, a DVD, a BD, etc. Alternatively, where a solid state drive is involved, disk 1522 would not be included, unless separate. While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and drive 1520 can be connected to the system bus 1508 by an HDD interface 1524, an external storage interface 1526 and a drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above, such as but not limited to a network virtual machine providing one or more aspects of storage or processing of information. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 16:
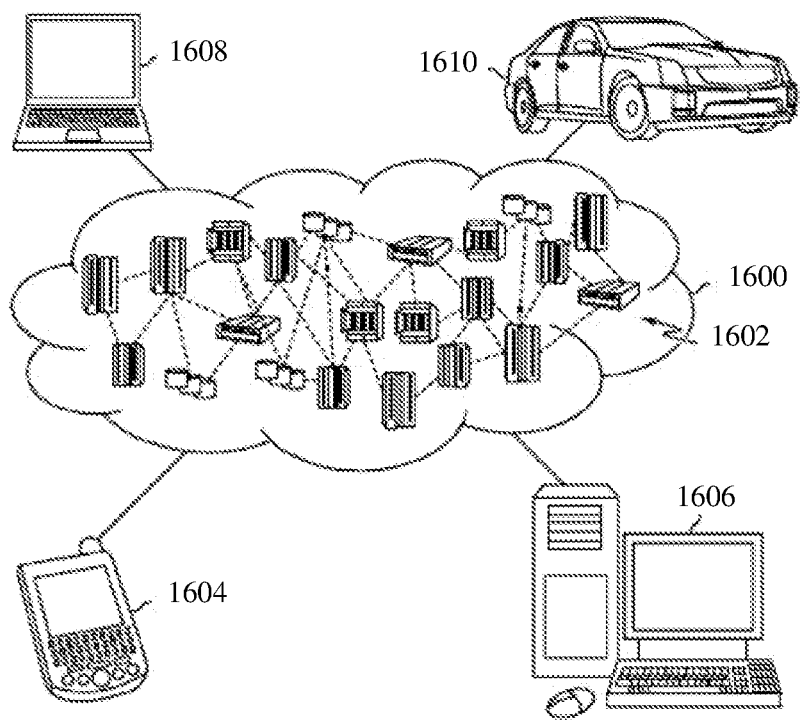
FIG. 16 illustrates an example, non-limiting cloud computing environment in accordance with one or more embodiments described herein.

Referring now to FIG. 16, illustrative cloud computing environment 1600 is depicted. As shown, cloud computing environment 1600 includes one or more cloud computing nodes 1602 with which local computing devices used by cloud consumers, such as, for example, personal digital assistant (PDA) or cellular telephone 1604, desktop computer 1606, laptop computer 1608, and/or automobile computer system 1610 may communicate. Nodes 1602 may communicate with one another. They may be grouped (not shown) physically or virtually, in one or more networks, such as Private, Community, Public, or Hybrid clouds as described hereinabove, or a combination thereof. This allows cloud computing environment 1600 to offer infrastructure, platforms and/or software as services for which a cloud consumer does not need to maintain resources on a local computing device. It is understood that the types of computing devices 1604-1610 shown in FIG. 16 are intended to be illustrative only and that computing nodes 1602 and cloud computing environment 1600 can communicate with any type of computerized device over any type of network and/or network addressable connection (e.g., using a web browser).

Figure 17:
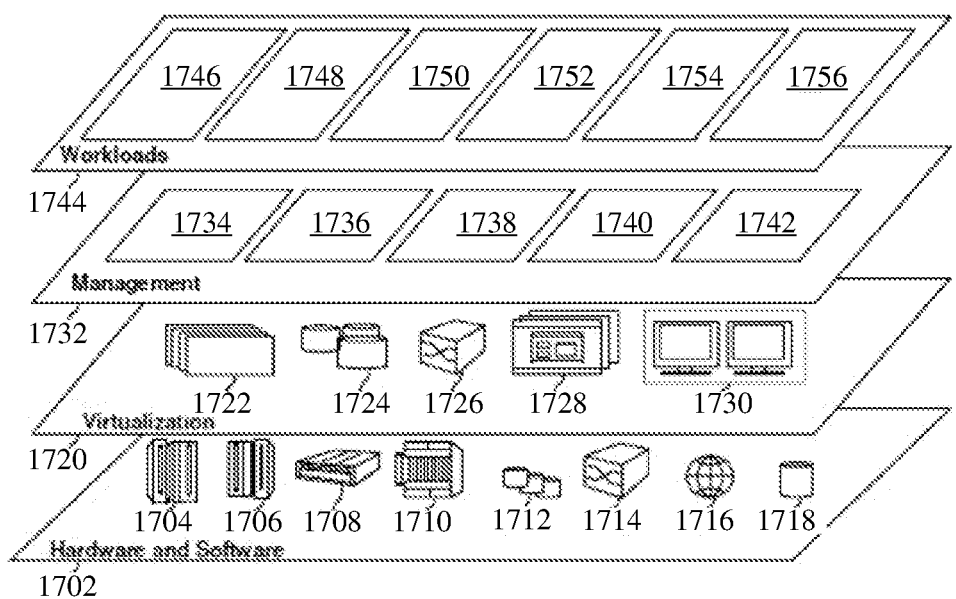
FIG. 17 illustrates example, non-limiting abstraction model layers in accordance with one or more embodiments described herein.

Referring now to FIG. 17, a set of functional abstraction layers provided by cloud computing environment 1600 (FIG. 16) is shown. Repetitive description of like elements employed in other embodiments described herein is omitted for sake of brevity. It should be understood in advance that the components, layers, and functions shown in FIG. 17 are intended to be illustrative only and embodiments of the invention are not limited thereto. As depicted, the following layers and corresponding functions are provided.

Hardware and software layer 1702 includes hardware and software components. Examples of hardware components include: mainframes 1704; RISC (Reduced Instruction Set Computer) architecture based servers 1706; servers 1708; blade servers 1710; storage devices 1712; and networks and networking components 1714. In some embodiments, software components include network application server software 1716 and database software 1718.

Virtualization layer 1720 provides an abstraction layer from which the following examples of virtual entities may be provided: virtual servers 1722; virtual storage 1724; virtual networks 1726, including virtual private networks; virtual applications and operating systems 1728; and virtual clients 1730.

In one example, management layer 1732 may provide the functions described below. Resource provisioning 1734 provides dynamic procurement of computing resources and other resources that are utilized to perform tasks within the cloud computing environment. Metering and Pricing 1736 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1738 provides access to the cloud computing environment for consumers and system administrators. Service level management 1740 provides cloud computing resource allocation and management such that required service levels are met. Service Level Agreement (SLA) planning and fulfillment 1742 provide pre-arrangement for, and procurement of, cloud computing resources for which a future requirement is anticipated in accordance with an SLA.

Workloads layer 1744 provides examples of functionality for which the cloud computing environment may be utilized. Examples of workloads and functions which may be provided from this layer include: mapping and navigation 1746; software development and lifecycle management 1748; virtual classroom education delivery 1750; data analytics processing 1752; transaction processing 1754; and differentially private federated learning processing 1756. Various embodiments of the present invention can utilize the cloud computing environment described with reference to FIGS. 16 and 17 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, and/or data structures, that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor that executes computer-executable components stored in a computer-readable memory, the computer-executable components comprising:
   a receiver component that accesses a qubit topology;
   an optimization component that identifies, based on a set of two-level-system (TLS) frequency regions of the qubit topology, one or more Stark tone frequencies; and
   an execution component that:
   applies, to a qubit lattice corresponding to the qubit topology, one or more Stark tones that have the one or more Stark tone frequencies; and
   eliminates frequency collisions in the qubit lattice such that Stark tone tuning eliminates direct frequency collisions between neighboring qubits and also eliminates TLS frequency collisions for each individual qubit.

2. The system of claim 1, wherein the computer-executable components further comprise:
   an execution component that applies, to a qubit lattice corresponding to the qubit topology, one or more Stark tones that have the one or more Stark tone frequencies, thereby eliminating frequency collisions in the qubit lattice.

3. The system of claim 1, wherein the computer-executable components further comprise:
   a scanning component that identifies, via application of qubit relaxation spectroscopy to a qubit lattice corresponding to the qubit topology, the set of TLS frequency regions.

4. The system of claim 1, wherein the optimization component identifies the one or more Stark tone frequencies by executing an optimizer on a set of collision constraints, wherein the set of collision constraints include a set of TLS collision constraints that are based on the set of TLS frequency regions.

5. The system of claim 4, wherein the set of collision constraints further include a set of qubit-to-qubit collision constraints and a set of tone-to-qubit collision constraints.

6. A computer-implemented method, comprising:
accessing, by a device operatively coupled to a processor, a qubit topology;
identifying, by the device and based on a set of two-level-system (TLS) frequency regions of the qubit topology, one or more Stark tone frequencies;
applying, by the device, and to a qubit lattice corresponding to the qubit topology, one or more Stark tones that have the one or more Stark tone frequencies; and
eliminating, by the device, frequency collisions in the qubit lattice such that Stark tone tuning eliminates direct frequency collisions between neighboring qubits and also eliminates TLS frequency collisions for each individual qubit.

7. The computer-implemented method of claim 6, further comprising:
identifying, by the device and via application of qubit relaxation spectroscopy to a qubit lattice corresponding to the qubit topology, the set of TLS frequency regions.

8. The computer-implemented method of claim 6, wherein the device identifies the one or more Stark tone frequencies by executing an optimizer on a set of collision constraints, wherein the set of collision constraints include a set of TLS collision constraints that are based on the set of TLS frequency regions.

9. The computer-implemented method of claim 8, wherein the set of collision constraints further include a set of qubit-to-qubit collision constraints and a set of tone-to-qubit collision constraints.

10. A computer program product for facilitating TLS-based optimization of Stark tone tuning, the computer program product comprising a non-transitory computer-readable memory having program instructions embodied therewith, the program instructions executable by a processor to cause the processor to:
access a qubit topology;
identify, based on a set of two-level-system (TLS) frequency regions of the qubit topology, one or more Stark tone frequencies;
apply to a qubit lattice corresponding to the qubit topology, one or more Stark tones that have the one or more Stark tone frequencies; and
eliminate frequency collisions in the qubit lattice such that Stark tone tuning eliminates direct frequency collisions between neighboring qubits and also eliminates TLS frequency collisions for each individual qubit.

11. The computer program product of claim 10, wherein the program instructions are further executable to cause the processor to:
identify, via application of qubit relaxation spectroscopy to a qubit lattice corresponding to the qubit topology, the set of TLS frequency regions.

12. The computer program product of claim 10, wherein the processor identifies the one or more Stark tone frequencies by executing an optimizer on a set of collision constraints, wherein the set of collision constraints include a set of TLS collision constraints that are based on the set of TLS frequency regions.

13. The computer program product of claim 12, wherein the set of collision constraints further include a set of qubit-to-qubit collision constraints and a set of tone-to-qubit collision constraints.

14. A device, comprising:
a processor that executes computer-executable components stored in a computer-readable memory, the computer-executable components comprising:
a scanning component that identifies, via qubit relaxation spectroscopy, a plurality of two-level-system (TLS) frequency regions associated with a qubit lattice, wherein the scanning component performs steps comprising:
sweeping operational frequency values of a defined qubit through a defined range of values, by applying one or more Stark tone frequencies to the defined qubit with varying amplitudes or varying durations, and the relaxation time of the defined qubit is measured and probed for one or more of the operational frequency values;
identifying one or more operational frequency intervals or ranges that cause the relaxation time of the defined qubit to decrease by a defined margin, wherein the relaxation time is decreased compared to another relaxation time prior to the identifying the one or more operational frequency intervals or ranges; and
marking such identified ones of the one or more operational frequency intervals or ranges as one or more TLS frequency regions of the defined qubit, wherein the one or more TLS frequency regions is comprised within a set of TLS frequency regions; and
an optimization component that calculates, based on the plurality of TLS frequency regions, at least one Stark tone frequency that prevents frequency collisions of the qubit lattice such that Stark tone tuning eliminates direct frequency collisions between neighboring qubits and also eliminates TLS frequency collisions for each individual qubit.

15. The device of claim 14, wherein the optimization component identifies at least one Stark shift that corresponds to the at least one Stark tone frequency, and wherein the computer-executable components further comprise:
an amplitude component that estimates at least one Stark tone amplitude that, in combination with the at least one Stark tone frequency, causes the at least one Stark shift.

16. The device of claim 15, wherein the computer-executable components further comprise:
an execution component that applies at least one Stark tone to the qubit lattice, according to the at least one Stark tone frequency and the at least one Stark tone amplitude.

17. The device of claim 15, wherein the optimization component calculates the at least one Stark tone frequency and the at least one Stark shift via an optimization engine that operates according to a plurality of collision constraints, wherein the plurality of collision constraints are based on the plurality of TLS frequency regions.

18. The device of claim 17, wherein the optimization engine implements mixed integer linear programming or mixed integer quadratic programming.

19. A computer-implemented method, comprising:
identifying, by a system operatively coupled to a processor and via qubit relaxation spectroscopy, a plurality of two-level-system (TLS) frequency regions associated with a qubit lattice;
sweeping, by the system, operational frequency values of a defined qubit through a defined range of values, by applying one or more Stark tone frequencies to the defined qubit with varying amplitudes or varying durations, and the relaxation time of the defined qubit is measured and probed for one or more of the operational frequency values;

identifying, by the system, one or more operational frequency intervals or ranges that cause the relaxation time of the defined qubit to decrease by a defined margin, wherein the relaxation time is decreased compared to another relaxation time prior to the identifying the one or more operational frequency intervals or ranges;

mark such identified ones of the one or more operational frequency intervals or ranges as one or more TLS frequency regions of the defined qubit, wherein the one or more TLS frequency regions is comprised within a set of TLS frequency regions; and calculate, based on the plurality of TLS frequency regions, at least one Stark tone frequency that prevents frequency collisions of the qubit lattice such that Stark tone tuning eliminates direct frequency collisions between neighboring qubits and also eliminates TLS frequency collisions for each individual qubit.

20. The computer-implemented method of claim 19, wherein the at least one Stark tone frequency corresponds to at least one Stark shift, and further comprising:
estimating, by the system, at least one Stark tone amplitude that, in combination with the at least one Stark tone frequency, causes the at least one Stark shift.

21. The computer-implemented method of claim 20, further comprising:
applying, by the system, at least one Stark tone to the qubit lattice, according to the at least one Stark tone frequency and the at least one Stark tone amplitude.

22. The computer-implemented method of claim 20, wherein the system calculates the at least one Stark tone frequency and the at least one Stark shift via an optimization engine that operates according to a plurality of collision constraints, wherein the plurality of collision constraints are based on the plurality of TLS frequency regions.

23. The computer-implemented method of claim 22, wherein the optimization engine implements mixed integer linear programming or mixed integer quadratic programming.

* * * * *